US012134435B2

(12) United States Patent
Breu et al.

(10) Patent No.: US 12,134,435 B2
(45) Date of Patent: Nov. 5, 2024

(54) GROUP OF MOTOR VEHICLES

(71) Applicant: Bayerische Motoren Werke Aktiengesellschaft, Munich (DE)

(72) Inventors: Thomas Breu, Edling (DE); Josip Durmis, Poing (DE); Wolfram Haug, Sauerlach (DE); Joerg Kutzschbach, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 399 days.

(21) Appl. No.: 17/636,598

(22) PCT Filed: Aug. 19, 2020

(86) PCT No.: PCT/EP2020/073224
§ 371 (c)(1),
(2) Date: Feb. 18, 2022

(87) PCT Pub. No.: WO2021/032790
PCT Pub. Date: Feb. 25, 2021

(65) Prior Publication Data
US 2022/0281543 A1    Sep. 8, 2022

(30) Foreign Application Priority Data

Aug. 19, 2019  (DE) .................. 10 2019 122 195.1

(51) Int. Cl.
*B62D 63/02* (2006.01)
*B60K 1/04* (2019.01)
(Continued)

(52) U.S. Cl.
CPC .............. *B62D 63/025* (2013.01); *B60K 1/04* (2013.01); *B60K 5/04* (2013.01); *B62D 25/08* (2013.01);
(Continued)

(58) Field of Classification Search
CPC .... B62D 63/025; B62D 25/08; B62D 25/085; B62D 25/087; B62D 25/2018; B62D 65/04; B60K 1/04; B60K 5/04; B60K 2001/0438
See application file for complete search history.

(56) References Cited

U.S. PATENT DOCUMENTS 6,981,736 B2 * 1/2006 Morsch .............. B62D 25/2018
                                                   296/187.03
9,096,277 B2 * 8/2015 Grosse ................... B62D 25/20
(Continued)

FOREIGN PATENT DOCUMENTS

CN        1684866 A      10/2005
CN      102085883 A       6/2011
(Continued)

OTHER PUBLICATIONS

International Search Report (PCT/ISA/210) issued in PCT Application No. PCT/EP2020/073224 dated Nov. 16, 2020 with English translation (six (6) pages).
(Continued)

*Primary Examiner* — Jacob B Meyer
(74) *Attorney, Agent, or Firm* — Crowell & Moring LLP

(57) ABSTRACT

In order to produce different motor vehicles of a vehicle type, which have the different drive concepts of an internal combustion engine, electric motor or a combination of an electric motor and an internal combustion engine, two different floor pan assemblies and two different luggage compartment floor subassemblies are provided. The two subassemblies are each produced using different deep-drawing dies. A combination of one of the two floor pan subassemblies with one of the two luggage compartment floor subassemblies allows the production of motor vehicles for all three drive concepts. The first of these two floor pan subassemblies, when installed in the vehicle, has a higher (Continued)

position than the second floor pan subassembly. The higher floor pan subassembly is used to produce both the electric-drive motor vehicles and hybrid-drive motor vehicles. A large-area installation space below the floor pan subassembly is also made available for the hybrid-drive motor vehicles for housing at least one pack-type battery.

20 Claims, 8 Drawing Sheets

(51) Int. Cl.
  *B60K 5/04* (2006.01)
  *B62D 25/08* (2006.01)
  *B62D 25/20* (2006.01)
  *B62D 65/04* (2006.01)
(52) U.S. Cl.
  CPC ......... *B62D 25/085* (2013.01); *B62D 25/087* (2013.01); *B62D 25/2018* (2013.01); *B62D 65/04* (2013.01); *B60K 2001/0438* (2013.01)

(56) References Cited

U.S. PATENT DOCUMENTS

| | | | | |
|---|---|---|---|---|
| 10,363,979 | B2 * | 7/2019 | Haug | B62D 25/2018 |
| 2006/0108834 | A1 | 5/2006 | Boulay et al. | |
| 2011/0139534 | A1 | 6/2011 | Klimek et al. | |
| 2017/0113542 | A1 | 4/2017 | Muramatsu et al. | |
| 2018/0086401 | A1 | 3/2018 | Haug et al. | |
| 2018/0229787 | A1 * | 8/2018 | Harmusz | C25D 13/14 |
| 2018/0229788 | A1 | 8/2018 | Erlacher et al. | |
| 2019/0061507 | A1 | 2/2019 | Nitta et al. | |
| 2022/0212721 | A1 * | 7/2022 | Eiletz | B60K 1/00 |
| 2022/0281542 | A1 * | 9/2022 | Breu | B60K 1/04 |
| 2022/0281543 | A1 * | 9/2022 | Breu | B62D 63/025 |
| 2023/0242195 | A1 * | 8/2023 | Beals | B62D 25/08 180/65.1 |
| 2023/0331323 | A1 * | 10/2023 | Haug | B62D 63/025 |
| 2023/0373289 | A1 * | 11/2023 | Grosse | B62D 25/2027 |

FOREIGN PATENT DOCUMENTS

| | | | | |
|---|---|---|---|---|
| CN | 105984508 A | * | 10/2016 | B60K 1/00 |
| CN | 106608284 A | | 5/2017 | |
| CN | 107128373 A | * | 9/2017 | B60K 1/04 |
| CN | 107667054 A | | 2/2018 | |
| CN | 108423092 A | * | 8/2018 | B60K 1/04 |
| CN | 114269636 A | * | 4/2022 | B60K 1/04 |
| CN | 114269637 A | * | 4/2022 | B60K 1/04 |
| CN | 116157319 A | * | 5/2023 | B60K 1/04 |
| CN | 114269636 B | * | 10/2023 | B60K 1/04 |
| CN | 114269637 B | * | 10/2023 | B60K 1/04 |
| DE | 10154353 A1 | * | 5/2002 | B60L 11/14 |
| DE | 10129738 A1 | * | 1/2003 | B62D 21/10 |
| DE | 102005032180 A1 | * | 1/2007 | B60N 2/015 |
| DE | 102008055738 A1 | * | 5/2010 | B62D 21/14 |
| DE | 10 2010 051 783 A1 | | 7/2011 | |
| DE | 10 2010 011 267 A1 | | 9/2011 | |
| DE | 10 2011 012 124 A1 | | 4/2012 | |
| DE | 102013000626 A1 | * | 7/2014 | B62D 25/20 |
| DE | 202014002557 U1 | * | 8/2015 | B60K 15/07 |
| DE | 10 2014 215 813 A1 | | 2/2016 | |
| DE | 102015016954 A1 | * | 7/2016 | |
| DE | 102018214265 A1 | * | 2/2019 | B60K 1/04 |
| DE | 102019122195 A1 | * | 2/2021 | B60K 1/04 |
| DE | 102020129667 A1 | * | 5/2022 | B60K 1/04 |
| GB | 2479978 A | * | 11/2011 | B62D 25/082 |
| KR | 20230010721 A | * | 1/2023 | |
| WO | WO-2004009429 A1 | * | 1/2004 | B62D 25/2018 |
| WO | WO-2004024543 A1 | * | 3/2004 | B62D 21/12 |
| WO | WO-2005056370 A1 | * | 6/2005 | B62D 23/00 |
| WO | WO-2012084085 A1 | * | 6/2012 | B62D 25/2009 |
| WO | WO-2016192921 A1 | * | 12/2016 | B62D 25/085 |
| WO | WO-2021032790 A1 | * | 2/2021 | B60K 1/04 |
| WO | WO-2021032791 A1 | * | 2/2021 | B60K 1/04 |
| WO | WO-2022006381 A1 | * | 1/2022 | B60K 1/04 |
| WO | WO-2022037808 A1 | * | 2/2022 | B60K 1/04 |
| WO | WO-2022049170 A1 | * | 3/2022 | B60K 1/04 |
| WO | WO-2022101180 A1 | * | 5/2022 | B60K 1/04 |

OTHER PUBLICATIONS

German-language Written Opinion (PCT/ISA/237) issued in PCT Application No. PCT/EP2020/073224 dated Nov. 16, 2020 (eight (3) pages).

German-language Search Report issued in German Application No. 10 2019 122 195.1 dated Jul. 20, 2020 with partial English translation (13 pages).

International Search Report (PCT/ISA/210) issued in PCT Application No. PCT/EP2020/073225 dated Nov. 16, 2020 with English translation (five (5) pages).

German-language Written Opinion (PCT/ISA/237) issued in PCT Application No. PCT/EP2020/073225 dated Nov. 16, 2020 (nine (9) pages).

English translation of Chinese Office Action issued in Chinese Application No. 202080058441.0 dated Apr. 14, 2023 (9 pages).

English translation of Chinese Office Action issued in Chinese Application No. 202080058442.5 dated Apr. 14, 2023 (9 pages).

* cited by examiner

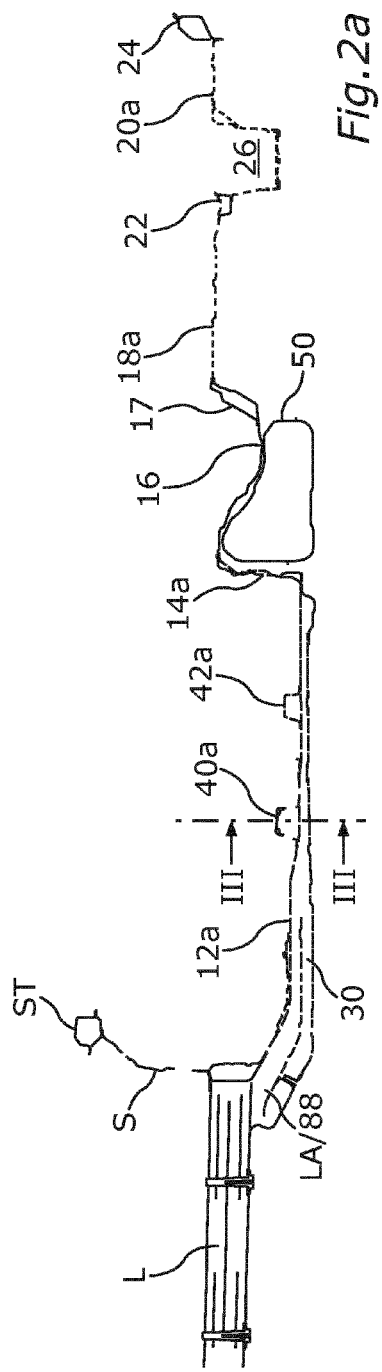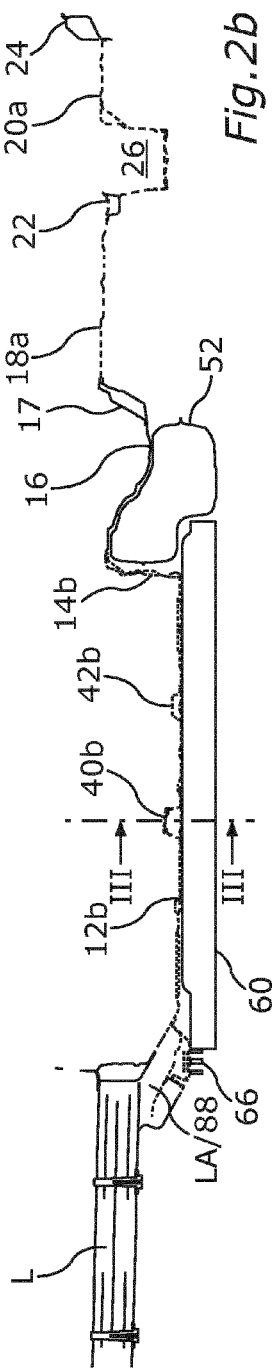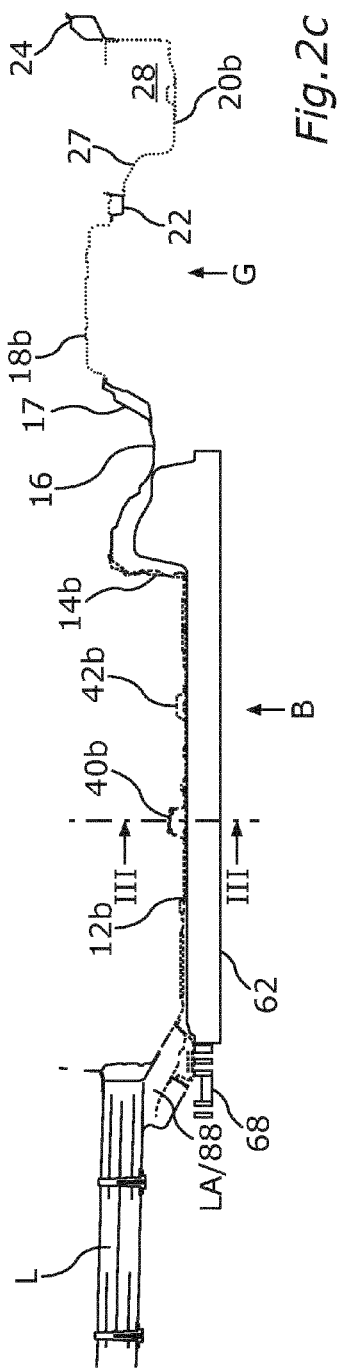

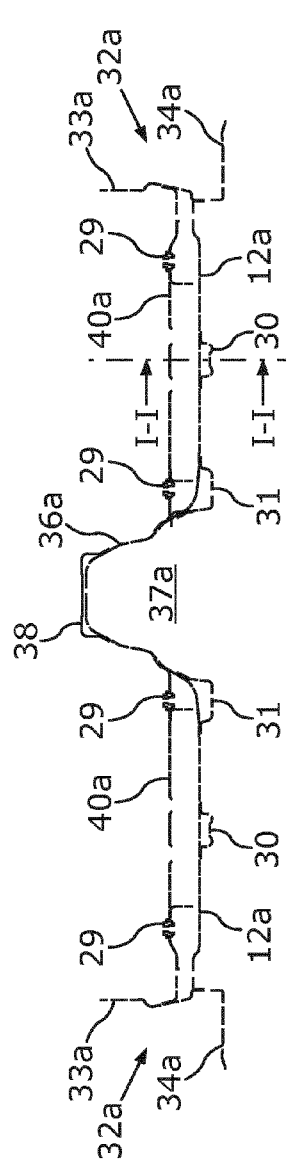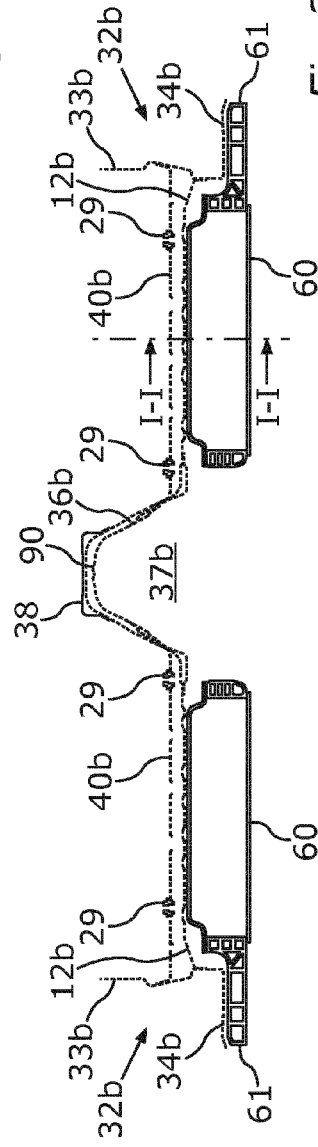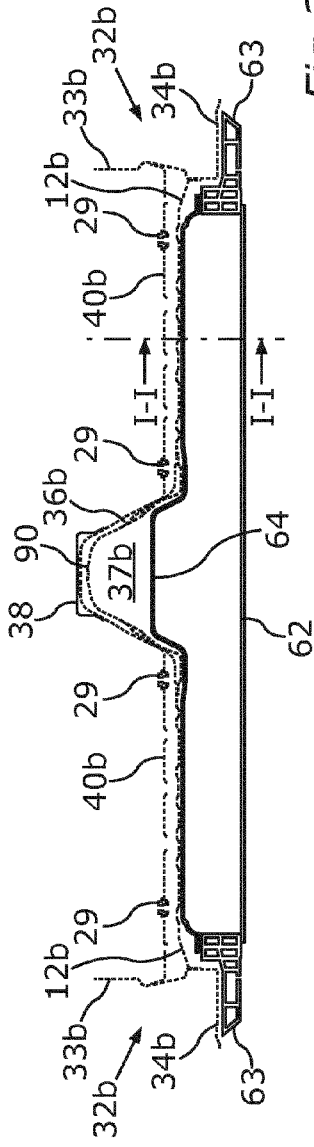

GROUP OF MOTOR VEHICLES

BACKGROUND AND SUMMARY OF THE INVENTION

The invention relates to a group of motor vehicles and to a method for producing a group of motor vehicles.

It is generally known that, in order to increase the economy of the process of manufacturing their motor vehicles, manufacturers of motor vehicles use as far as possible uniform components for the bodyshell structure, for example to produce body variants of a vehicle, that is to say a body variant for a combination motor vehicle and/or coupe and/or cabriolet etc. aside from a sedan, for example.

Furthermore, manufacturers of motor vehicles also use uniform components for the bodyshell structure for vehicles that belong to different "vehicle categories" or "vehicle segments", for example for motor vehicles in the mid-size category and the upper mid-size category. This use of uniform components is for example known, in the case of some manufacturers of motor vehicles, by the term "platform strategy".

In this context, it is known from WO 2016/192921 A1 to provide "front-end modules" and "passenger cell modules" in order to form motor vehicles in different vehicle categories, wherein the modules are combinable without limitation, and in this way the motor vehicles in the different vehicle categories can be formed. Here, the front-end modules have different engine bearer spacings, and the passenger cell modules have different spacings of the front seats.

Manufacturers of motor vehicles are increasingly offering vehicles of one vehicle type not only as vehicles with a combustion engine ("combustion drive") but also as vehicles with an electric motor as drive unit ("electric drive") and/or vehicles with a combination of a combustion engine and an electric motor ("hybrid drive"). Thus, under one vehicle type, there are motor vehicles with two or three different drive concepts. The three drive concepts will be referred to below as "combustion drive", "electric drive" and "hybrid drive".

Here, from economic aspects considered by the applicant, it is of particular interest to be able to manufacture motor vehicles with the above-stated three drive concepts with as far as possible uniform components for the bodyshell structure. Since the distribution of the demand among the three drive concepts within one vehicle type is not foreseeable, it is sought to achieve the greatest possible flexibility in the manufacturing process in order to be able to react in a situation-dependent manner to changes in the demand for motor vehicles with the different drive concepts.

It is furthermore generally known for motor vehicles with "electric drive" to be equipped with a battery which is arranged over a large area in the region of the vehicle floor. For this purpose, the floor region of these motor vehicles is arranged higher than in the case of a motor vehicle of the same vehicle type with "combustion drive", preferably while maintaining the same position of the seats in the motor vehicle, that is to say with an identical H-point (hip point).

Furthermore, it is known for example from the applicant's motor vehicles with "hybrid drive" to arrange the battery in the region in front of the rear axle, that is to say in the installation space which, in a motor vehicle with "combustion drive", is provided for accommodating a fuel tank. In these motor vehicles, the fuel tank is arranged in the luggage compartment above the rear axle. Disadvantages of the known arrangement are the limited size both of a battery and of a fuel tank and the reduction in the volume of the luggage compartment. Furthermore, the different installation sequence for the fuel tanks for motor vehicles with "combustion drive" and with "hybrid drive" makes the production of the motor vehicles more difficult.

Furthermore, it is known for example from motor vehicles of the Mercedes and Porsche brands with "hybrid drive" to arrange the battery in the region of the luggage compartment and to leave the fuel tank in that installation space in front of the rear axle which is also provided for this in the case of the motor vehicles with "combustion drive".

Furthermore, DE102008055738A1 has disclosed a modular system for the construction of a motor vehicle body, in which modules from at least two module groups are freely combinable with one another and selectable. In particular, provision is made here to design multiple main floor modules and multiple front-end and rear-end modules to be freely combinable, such that, for example, different drive concepts or floor heights do not impede the free combinability of the main floor with the front-end and rear-end structures.

It is an object of the invention to provide a new approach for the production of bodyshell structures for motor vehicles of one vehicle type with the three different drive concepts mentioned above, whilst making the most extensive possible use of uniform components for the bodyshell structure. It is furthermore sought to provide, by means of the invention, a new approach for the production of bodyshell structures for motor vehicles of one vehicle type with the three different drive concepts mentioned above, which approach makes it possible, in the case of motor vehicles with "hybrid drive", to accommodate the largest possible battery, whilst making the most extensive possible use of uniform components for the bodyshell structure.

Said object is achieved by means of a group of motor vehicles having the features of claim 1. Claim 18 relates to a method for producing motor vehicles.

A core concept of the invention is to use only two different floor panel subassemblies and two different luggage compartment floor subassemblies for the abovementioned three drive concepts of one vehicle type, wherein motor vehicles with all three drive concepts can be realized through combination of the stated subassemblies. By means of the invention, a modular vehicle architecture is provided with which only two different floor panel subassemblies and two different luggage compartment floor subassemblies are required for motor vehicles with a total of three drive concepts.

In this regard, the following definitions are used:

"Vehicle type": also referred to colloquially as "vehicle model", that is to say motor vehicles whose external appearance is substantially identical (irrespective of the drive concept). An example of this is applicant's vehicle type with the model designation "BMW 2 Series Active Tourer". At the time of filing of the present patent application, this vehicle type is available in several variants with combustion engine and in one variant with hybrid drive ("BMW 225xe iPerformance Active Tourer"), wherein the variant with hybrid drive has a substantially identical external appearance to the motor vehicles with combustion engine.

"Group of motor vehicles": the entirety of the motor vehicles of one vehicle type, irrespective of the drive concept.

"Drive concepts" are "combustion engine" (or "combustion drive"), "electric motor" (or "electric drive") and "hybrid drive", hereinafter also referred to, in this sequence, by "ICE" (Internal Combustion Engine) and "BEV" (Battery Electric Vehicle) and "PHEV" (Plug-in Hybrid Electric Vehicle" respectively. Here, "HEV" (Hybrid Electric Vehicle) also encompasses "PHEV".

"Combustion engine": combustion machine which is operated with a fuel (gasoline, diesel, hydrogen, etc.) and which serves for driving a motor vehicle.

"Electric motor": electric machine for driving a motor vehicle.

"Battery": accumulator for storing electrical energy for feeding to the electric motor, that is to say "drive battery". The expression "high-voltage battery" is commonly also used.

"Hybrid drive": combination of a combustion engine and at least one electric motor as drive units for driving a motor vehicle. The variant of the hybrid drive with the possibility of charging the battery of the motor vehicle with electrical energy from outside the motor vehicle is commonly referred to as "Plug-in Hybrid Electric Vehicle".

"Bodyshell structure": assembly of the components that form the load-bearing structure of the motor vehicle. The components are for example sheet-metal components that have been connected to one another. This expression also encompasses an assembly composed of sheet-metal or cast components. The sheet-metal components that have been connected to one another may be metal sheets composed of different materials, for example steel and aluminum.

"Floor panel subassembly": components of the bodyshell structure which, in their entirety, form the lower passenger cell region of the motor vehicle. These include in particular the lateral floor panel sections, the central tunnel and the heel plate.

"Luggage compartment floor subassembly": components of the bodyshell structure which, in their entirety, in a vehicle longitudinal direction, form the region from a "front transverse member, rear axle" to a rear-end terminating member. In a vehicle transverse direction, the luggage compartment floor subassembly extends between a right-hand and a left-hand wheel arch and encompasses the rear-end longitudinal members.

"Central tunnel": tunnel running along the vehicle longitudinal central plane, in the free space underneath which there is arranged for example a driveshaft and/or at least one exhaust line and/or at least one media line.

"Front-end subassembly": components of the bodyshell structure which, in their entirety, in a vehicle longitudinal direction, form the load-bearing region including a bulkhead. These include in particular the front longitudinal members, which, with the front axle, accommodate a drive unit and, in the event of a frontal crash, dissipate a significant amount of crash energy.

Each of the two floor panel subassemblies is in itself an "identical part", irrespective of which of the three different motor vehicles the respective floor panel subassembly is used in. It is characteristic of these "identical parts" that all examples of the first floor panel subassembly are produced using the same first deep-drawing tool or using the same first set of deep-drawing tools. Analogously, all examples of the second floor panel subassembly are produced using the same second deep-drawing tool or using the same second set of deep-drawing tools.

This applies analogously to the two luggage compartment floor subassemblies.

In the context of the present invention, "the same deep-drawing tool" may be substituted by the equivalent term "the same casting tool", and likewise a combination of the two stated tools. For linguistic simplicity, primarily only "deep-drawing tools" will be referred to below. The production of components of the bodyshell structure by deep drawing is the most commonly used production method.

The expression "identical part" thus encompasses components for the bodyshell structure that have been produced using the same deep-drawing tool. Following the production process in the pressing plant, these "identical parts" may for example be varied in terms of their length dimension by shortening or by lengthening. In the case of shortening by cutting to length, it is for example the case that a longitudinal member or a deep-drawn areal panel section that is used commonly for the motor vehicles of two drive concepts is shortened, in a manner dependent on the drive concept, by trimming at one of its end sections. Alternatively, the longitudinal member or the panel section may also be lengthened, in a manner dependent on the drive concept or vehicle category, by attachment of a lengthening piece by riveting, welding, screw connection, adhesive bonding etc. These length adaptations by cutting to length (trimming) or by lengthening (attachment of add-on pieces) are manufacturing steps that are performed as a retroactive measure on "identical parts" that have previously been produced using a uniform deep-drawing tool, such that only relatively low work and tooling costs are incurred for these retroactive measures.

Deep-drawn sheet-metal components are for example a floor panel, longitudinal members etc. The sheet-metal material may be homogeneous along its areal extent, or may for example be formed by a so-called "tailored blank".

With regard to the floor panel subassembly, "scaling" is possible for example by trimming of the floor panel subassembly in a longitudinal direction of the motor vehicle in order to realize different wheelbase dimensions.

Furthermore, the expression "identical part" encompasses bodyshell parts that are produced using the same casting tool. The advantage of cast components lies inter alia in the wide variety of possibilities for the integration of functions, attachment parts, connecting regions etc. For example, suspension strut receptacles can advantageously be formed by cast components.

It is basically possible, on the "identical parts" of each of the two floor panel subassemblies or each of the two luggage compartment floor subassemblies, four different patterns of holes to be applied, by punching, drilling etc., for the connection of the "identical part" to the adjoining bodyshell and/or to attachment parts. It is however essential for the "identical parts" that, after the production process in the same deep-drawing tool, no further shape-imparting modifications are made. Through the use of a uniform deep-drawing tool that is used for all of the different drive concepts, the investment costs for manufacturing facilities are significantly reduced. Different patterns of holes are necessary for example for the production of motor vehicles in versions for different countries, as so-called left-hand-drive vehicles" or "right-hand-drive vehicles", or with different exhaust systems.

Furthermore, a multiplicity of fastening points (roughly screw connection points) may be provided on the identical parts, wherein at least one motor vehicle with a particular drive concept uses only some of the fastening points.

"Identical parts" may self-evidently also, at least in part, be designed as identical components.

The identical parts in the individual motor vehicles or drive concepts may be supplemented by specific "adaptation parts", such as different specific cross braces in an identical tunnel region or different brackets on an identical front-end and/or bulkhead region.

It is particularly advantageous if a first floor panel subassembly is, in its installed position in the motor vehicle, arranged higher than a second floor panel subassembly. In this way, more structural space is available underneath the first floor panel subassembly than underneath the second floor panel subassembly, for example for the arrangement of at least one battery. Correspondingly, in the case of the second floor panel subassembly, more structural space is available above the floor panel subassembly for the configuration of the vehicle interior compartment.

In the context of the present invention, "arranged higher" means that at least a relevant subregion, in terms of area, of the first floor panel subassembly is arranged further upward in the vertical direction of the motor vehicle than in the case of the second floor panel subassembly.

In the context of the present invention, "arranged higher" encompasses a situation in which parts of the two floor panel subassemblies are arranged at the same height. For example, this may apply to a central tunnel that has an identical position for both floor panel subassemblies.

In a further embodiment of the invention, one of the two floor panel subassemblies is configured such that, in the installed position in the motor vehicle, it can, at its underside, accommodate batteries of different size and/or different shape. For this purpose, the first floor panel subassembly is preferably used, because it provides more structural space at its underside than the second floor panel subassembly.

The batteries may differ in terms of external size by way of correspondingly different dimensions. Likewise, "batteries of different size" may also differ in terms of their storage capacity, that is to say in the amount of charge that can be drawn.

It is particularly advantageous if a first luggage compartment floor subassembly, in its installed position in the motor vehicle, is in its front region arranged higher than the second luggage compartment floor subassembly. In this way, in the case of the first luggage compartment floor subassembly, more structural space is available underneath the luggage compartment floor subassembly, for example for the arrangement of at least one electric motor and/or of a rear axle. In particular, this structural space is required for the arrangement of an electric motor at the rear axle of a motor vehicle with "electric drive" (BEV), for example in a structural unit with an inverter for converting the direct current from the battery into alternating current for feeding to the electric motor.

Correspondingly, in the case of the second luggage compartment floor subassembly (in the case of which the front region is arranged lower than in the case of the first luggage compartment floor subassembly), more structural space is available above the luggage compartment floor subassembly for forming the luggage compartment, for a greater storage capacity of the luggage compartment and/or a better geometrical configuration of the luggage compartment.

In the context of the present invention, "arranged higher" means that the front region of the first luggage compartment floor subassembly is arranged further upward in the vertical direction of the motor vehicle than in the case of the second luggage compartment floor subassembly. It is preferable here for not the entire front region of the first luggage compartment floor subassembly but only the central region thereof, which is situated between the longitudinal members in a transverse direction, to be arranged higher. The lateral regions of the luggage compartment floor subassembly are attached via uniform members to the rear-end region of the motor vehicle. A uniform rear-end member structure can thus be used as a basis for all motor vehicles of the group according to the invention.

Here, the two luggage compartment floor subassemblies may be of uniform or different design in their rear region.

In one embodiment of the invention, the rear region of the first luggage compartment floor subassembly is, at least in one subregion, arranged lower than in the case of the second luggage compartment floor subassembly (for example in the absence of an end muffler). In particular in the case of a motor vehicle with "electric drive" (BEV), freedom is provided in the rear region of the luggage compartment floor subassembly with regard to the design of this body section. Here, the structural space that is available as a result of the omission of an exhaust system can be utilized by a rear luggage compartment tray shaped specifically for the purpose. These embodiments are however not imperative, by contrast to the above-described raising of the front region of the first luggage compartment floor subassembly in order to provide a sufficient structural space there for accommodating an electric motor at the rear axle.

Thus, the increased structural space requirement in the front region of the first luggage compartment floor subassembly, which arises in the case of the motor vehicles with "electric drive" from the accommodation of the electric motor, can be compensated by the structural space that is available in the rear region of the luggage compartment floor subassembly owing to the omission of the exhaust system, which has a corresponding effect on the usable luggage compartment volume.

Correspondingly, in one embodiment of the invention, the second luggage compartment floor subassembly is designed such that, in its rear region in the installed position in the motor vehicle, it is arranged higher, at least in certain sections, than the first luggage compartment floor subassembly (for example the purposes of accommodating an end muffler).

The front region of the luggage compartment floor subassembly will also be referred to in the context of the present invention as "front luggage compartment floor". Correspondingly, the rear region of the luggage compartment floor subassembly will also be referred to in the context of the present invention as "rear luggage compartment floor".

In one embodiment of the invention, one of the two luggage compartment floor subassemblies is designed such that, in the installed position in the motor vehicle, it can, at its underside, accommodate at least one electric motor and/or different electric motors. For this purpose, use may basically be made of the first or the second luggage compartment floor subassembly, depending on the structural space required. Here, the expression "accommodate" encompasses all conceivable types of attachment and/or fastening of the electric motor, including an integration into the structure, or the provision of a housing.

Aside from the components mentioned above, it is self-evident that, in common motor vehicles, a rear axle is arranged underneath the luggage compartment floor subassembly.

In one advantageous embodiment of the invention, in the case of the motor vehicles with "combustion drive", the floor region of the bodyshell structures is formed by a combination of the second floor panel subassembly with the second luggage compartment floor subassembly. A relatively large vehicle interior compartment can thus be realized in the region of the floor panel subassembly. Owing to the relatively small structural space requirement below the front region of the luggage compartment floor subassembly, a relatively large luggage compartment is realized. In the case of this combination, the rear region of the luggage compartment floor subassembly provides sufficient structural space in particular for the one or more end mufflers of the exhaust system, together with a rear luggage compartment floor arranged at a relatively high level, and a resulting small stowage volume in the luggage compartment.

Here, it is also possible for different mufflers to be provided, for example in a manner dependent on the power output of the combustion engine and/or the type of drive ("combustion drive" or "hybrid drive").

In one advantageous embodiment of the invention, in the case of the motor vehicles with "hybrid drive", the floor region of the bodyshell structures is formed by combination of the first floor panel subassembly with the second luggage compartment floor subassembly. This combination provides sufficient structural space for the arrangement of at least one battery underneath the floor panel subassembly. Furthermore, in the case of this combination, a relatively large luggage compartment can be realized above the front region of the luggage compartment floor subassembly. Owing to the relatively small electric motor, the motor vehicles with "hybrid drive" require only a relatively small structural space underneath the front region of the luggage compartment floor subassembly. The electric motor of the motor vehicles with "hybrid drive" may for example be implemented in a structural unit with a rear-axle transmission.

Likewise, in the case of the motor vehicles with "combustion drive" or "hybrid drive", the structural space underneath the luggage compartment floor subassembly can be designed for the installation of different rear axles or rear-axle systems. In the case of a motor vehicle with "standard drive", the combustion engine is arranged in front of the passenger cell. The rear wheels are driven via a driveshaft that is guided in the central tunnel to the rear of the motor vehicle. In the case of a motor vehicle with front-wheel drive, the driveshaft, and a transmission at the rear axle, are omitted, such that less structural space is required for the rear axle. A motor vehicle with front-wheel drive furthermore requires less structural space in the central tunnel owing to the omission of the driveshaft.

Furthermore, in the case of a motor vehicle with "combustion drive" or "hybrid drive" and with front-wheel drive, the exhaust system may be designed so as to have one or more end mufflers in the region under the passenger cell, that is to say in the (front) region of a central tunnel. More structural space is thus available in the rear section of the motor vehicle, for example for accommodating a relatively large fuel tank in the region of the so-called heel plate. Owing to the omission of an exhaust line and end muffler in the region of the luggage compartment floor subassembly, more volume is also available here in the luggage compartment and/or underneath the luggage compartment floor subassembly.

In one advantageous embodiment of the invention, in the case of the motor vehicles with "electric drive", the floor region of the bodyshell structures is formed by combination of the first floor panel subassembly with the first luggage compartment floor subassembly. This combination provides sufficient structural space underneath the floor panel subassembly for the arrangement of at least one battery. Furthermore, this drive concept requires a relatively large amount of structural space underneath the front region of the luggage compartment floor subassembly for the purposes of accommodating at least one electric motor in the region of the rear axle. Owing to the absence of an exhaust system, however, it is possible under some circumstances to realize a relatively large luggage compartment above the rear region of the luggage compartment floor subassembly, which compensates for the loss of stowage space in the front region of the luggage compartment floor subassembly.

In one advantageous embodiment of the invention, the bodyshell structure of the motor vehicles is designed, in the region underneath a bulkhead of the motor vehicles, such that different batteries can be attached in this region. It is thus possible in particular for the different batteries in the case of motor vehicles with "electric drive" and in the case of the motor vehicles with "hybrid drive" to be attached to a uniform bodyshell structure. The different batteries may in this case be fastened to the bodyshell structure by means of correspondingly designed brackets. The brackets may be provided either on the bodyshell structure or on the batteries or both on the bodyshell structure and on the batteries.

The expression "in the region underneath the bulkhead" defines the position of the attachment of the battery to the bodyshell structure in a longitudinal direction of the motor vehicle. The battery is preferably attached directly or indirectly to the front longitudinal members (engine bearers) that end in this region.

For this purpose, in the region of the end sections of the front longitudinal members, a multiplicity of screw connection points is provided in order to enable the battery or batteries to be attached to the bodyshell structure in correspondingly rigid fashion. Here, for example in the case of a motor vehicle with "electric drive", all screw connection points provided are utilized for the attachment of the battery, whereas in the case of a motor vehicle with "hybrid drive", only some of the screw connection points are utilized for the attachment of the battery or batteries. The screw connection points not required for the fastening of the battery or batteries may for example be utilized for the attachment of specific stiffening means and/or shear panels.

Analogously, the region of the side longitudinal members of the motor vehicles may be configured for the attachment of different batteries. It is thus possible in particular for the different batteries in the case of motor vehicles with "electric drive" and in the case of the motor vehicles with "hybrid drive" to be attached to a uniform bodyshell structure. It is preferable here for different brackets to be provided on the batteries. It is however self-evidently also possible for brackets to be provided on the bodyshell structure or both on the bodyshell structure and on the batteries.

The batteries may differ in terms of external size by way of correspondingly different dimensions. Likewise, "batteries of different size" may also differ in terms of their storage capacity, that is to say in the amount of charge that can be drawn.

In the case of motor vehicles with "hybrid drive" and in each case one battery to the right and to the left of a central tunnel (wherein the two batteries may be connected to one another in the form of a preassembled unit), aside from an attachment of the batteries in the region underneath the bulkhead, the batteries may also be attached to the bodyshell structure at their inner sides pointing toward the central tunnel.

In one embodiment of the invention, provision is made for the region of the side longitudinal members of the motor vehicles to be equipped with a pattern of holes which has a multiplicity of screw connection points, wherein the pattern of holes is configured for the screw fastening of different batteries. By means of this design of the pattern of holes, it is possible in particular for different batteries to be attached in the case of motor vehicles with "electric drive" and in the case of the motor vehicles with "hybrid drive". Here, different brackets may be provided on the batteries.

For example, the following configurations are possible: the different batteries or the brackets thereof utilize the pattern of holes on the bodyshell in an identical manner with all screw connection points. Alternatively, the screw connection points are partially shared by the different batteries or the brackets thereof, but at least one screw connection point is utilized only by one battery. In the stated alternative, it is important that the screw connection points utilized by the different batteries or the brackets thereof are spaced apart from one another such that there is no overlap of the screw connection points and/or no mutual weakening of the screw connection points.

The same applies analogously to the fastening of the battery or batteries in the region underneath the bulkhead.

The screw connection points for the batteries may advantageously also be utilized for the installation of the batteries, as pegging holes (alignment points) for receiving joining pins.

The pegging holes serve for the exact positioning of the battery or batteries, for example, during the installation process, in that, during the mounting of the battery or batteries onto the motor vehicle, at least one pin provided on an installation tool engages into the at least one pegging hole and thus positions the installation tool with the battery situated thereon on the motor vehicle in an exact manner before the screw connection of the battery to the bodyshell structure is performed.

In the case of floor panel subassemblies of different length, the batteries may be used in an identical manner irrespective of the structural spaces of different size in a vehicle longitudinal direction that are available underneath the floor panel subassemblies. Alternatively, it is possible to use different batteries (in particular batteries of different length) with the floor panel subassemblies of different length.

In the case of the motor vehicles with "hybrid drive", it is preferable for one battery to be provided on each side of the vehicle. Instead of one right-hand battery and one left-hand battery, it is self-evidently also possible for two or more batteries to be provided on each side of the vehicle. In the case of a motor vehicle with "hybrid drive", it is basically also possible for one battery or multiple batteries to be provided only on one side of the central tunnel, and for the structural space on the other side of the central tunnel to be occupied by other components, for example by a fuel tank of correspondingly flat design. In the case of the motor vehicles with "electric drive", it is preferable for a single battery to be provided (this means a multiplicity of battery cells in a single battery housing). This battery preferably extends over a major part of the width of the floor panel subassembly.

In one embodiment of the invention, the two floor panel subassemblies are designed, at their front end sections, so as to be connectable to a common bulkhead. It is achieved in this way that, irrespective of the floor panel subassembly that is used, the front-end structure can be of uniform design in the region of the bulkhead. If different central tunnels are used in the two floor panel subassemblies, then the front end sections of the central tunnel are preferably also of identical design so as to be connectable to a common bulkhead. This standardization reduces the costs for the production of the motor vehicles with the three different drive concepts.

In a further embodiment of the invention, it is preferably the case that, in the motor vehicles with "hybrid drive", additional screw connection points are provided in the region of the central tunnel, preferably at the tunnel boundary, for the attachment of the left-hand and of the right-hand battery or batteries at their longitudinal side facing toward the center of the vehicle.

The screw connection points may also serve as pegging holes (alignment points) for the manufacturing systems for the production of the motor vehicles with "hybrid drive", and possibly also in the case of the motor vehicles with "combustion drive".

Depending on the motor vehicle, a driveshaft and/or at least one exhaust line and/or at least one media line and/or at least one electrical line may be accommodated in the structural space delimited by the central tunnel.

In order to adapt the region of the central tunnel to the requirements of the motor vehicles of the individual drive concepts, "adaptation parts" are provided, for example in the form of tunnel reinforcements for a driveshaft center bearing (not in the case of motor vehicles with "electric drive").

In one body of the invention, the two floor panel subassemblies have different central tunnels.

In a further embodiment of the invention, the different central tunnels are configured such that they can accommodate a uniform central console on their upper side in the interior compartment of the motor vehicle. Here, by way of example, at least one tunnel top panel is mounted onto the top side of the central console, wherein the at least one tunnel top panel is configured for the attachment of the common central console. The tunnel top panel is preferably likewise a common component.

In one embodiment of the invention, in the case of the motor vehicles with "hybrid drive" which have in each case at least one battery to both sides of the central tunnel, at least one battery bridge is provided which connects the two batteries to one another in the sense of a preassembled unit such that the batteries can be inserted as a unit, for example together with the drivetrain, into the floor panel subassembly. The at least one battery bridge is designed such that it can withstand the loads during the loading and unloading of transport vehicles, during transport, during warehousing, during installation and during servicing (when the battery is for example dismounted in a workshop). The electrical lines and possibly further lines (for example for a cooling medium) are preferably also integrated into the preassembled unit.

Furthermore, in the case of the motor vehicles with "hybrid drive", after the batteries have been installed, stiffening bridges may additionally be provided which connect the two batteries to one another. In this way, a load path is created that allows the transmission of forces from the right-hand battery into the left-hand battery (and vice versa). Thus, by means of the batteries that have been screwed to the bodyshell structure of the motor vehicle, stiffening of the bodyshell structure is achieved by virtue of the batteries being integrated as force-accommodating components into the bodyshell. By means of the battery bridges and in particular by means of the stiffening bridges, significant stiffening of the bodyshell structure is achieved, in particular in a transverse direction of the motor vehicle. This increased stiffness in a transverse direction of the motor vehicle is advantageous for example in the event of a side-on crash. A significant increase in torsional stiffness can also be achieved by means of the at least one battery bridge and/or the at least one stiffening bridge. An improvement in the vibration behavior of the vehicle as a whole is also achieved by means of the at least one battery bridge and/or the at least one stiffening bridge.

The at least one battery bridge and/or stiffening bridge is preferably arranged detachably on the batteries.

In one possible embodiment of the invention, it is for example the case that two (or more) battery bridges are provided for the "cohesion" of the two batteries, and/or two (or more) stiffening bridges are provided for the introduction of force and transmission of force in the event of a side-on crash Furthermore, at least one tunnel reinforcement may be provided in the region of the central tunnel. The tunnel reinforcement is preferably configured as a sheet-metal component. The tunnel reinforcement is attached preferably by spot welding or roller welding. The tunnel reinforcement is advantageously mounted onto the inner side of the central tunnel. Through the stiffening of the region of the central tunnel, greater stability of the bodyshell structure in a transverse direction of the motor vehicle is achieved, with advantages with regard to the stiffness in the event of a side-on crash and/or with regard to the vibration behavior of the vehicle as a whole. Furthermore, a tunnel reinforcement can reinforce regions of the central tunnel into which a separate introduction of force occurs, as is the case for example at a bearing, which is arranged on the central tunnel, for a driveshaft.

In one advantageous embodiment of the invention, the fuel tank is arranged in front of the rear axle both in the case of the motor vehicles with "combustion drive" and in the case of the motor vehicles with "hybrid drive". Thus, a uniform filling system for the fuel, for example with the same filling pipes, can be provided for both motor vehicles.

The fuel tanks for the motor vehicles with "combustion drive", on the one hand, and with "hybrid drive", on the other hand, are however in principle of different design. In the case of motor vehicles with "hybrid drive", during driving in the purely electric mode and thus when fuel is not being extracted, a pressure build-up occurs in the fuel tank, which necessitates the use of a pressure tank, composed preferably of steel, in the case of these motor vehicles.

In one advantageous embodiment of the invention, in order to realize the motor vehicles with the three drive concepts, two different front-end subassemblies are provided in addition to the two floor panel subassemblies and the two luggage compartment floor subassemblies.

In one embodiment of the invention, a first front-end subassembly is provided in the case of which the front longitudinal members (engine bearers) end in the region of the bulkhead without continuation in central longitudinal members at the underside of the floor panel subassembly. This provides freedom for the design of the floor panel subassembly, because this does not need to be designed for the introduction of forces from the front longitudinal members. To nevertheless realize a sufficiently rigid attachment of the front longitudinal members to the bodyshell structure of the motor vehicle, it is for example the case that, on the end sections of the front longitudinal members in the region of the bulkhead, there are provided attachment parts and/or lateral supports to the sills, which ensure that the end sections of the front longitudinal members are supported over a large area. For the introduction of the forces from the front-end subassembly rearwardly in the longitudinal direction of the motor vehicle, use is instead made, for example, of at least one housing of a battery arranged underneath the floor panel subassembly.

A second front-end subassembly has front longitudinal members (engine bearers), the rear end sections of which are adjoined directly or indirectly by central longitudinal members, which begin in the region of the bulkhead and extend counter to the direction of travel into the region of the floor panel subassembly. In the case of this generally known design, the central longitudinal members are connected to the underside of the floor panel subassembly, preferably by welding. This has the result that forces are transmitted over a large area and in a uniform manner from the front longitudinal members into the floor panel subassembly.

The embodiment of the first front-end subassembly has the advantage that, in motor vehicles with "hybrid drive" or with "electric drive", at least one battery can be arranged in the region underneath the floor panel subassembly, commonly (also) in the front region thereof).

In a preferred embodiment of the invention, the following combination possibilities are realized:

To realize motor vehicles with "electric drive" or "hybrid drive", the first front-end subassembly is combined with the first floor panel subassembly. The first floor panel subassembly is arranged higher than the second floor panel subassembly, in order for a battery or batteries to be accommodated at the underside thereof. The battery or batteries occupies or occupy the structural space which, in motor vehicles with "combustion drive", is used for the arrangement of the central longitudinal members.

To realize motor vehicles with "combustion drive", the second front-end subassembly is combined with the second floor panel subassembly. The second floor panel subassembly is arranged lower than the first floor panel subassembly and does not need to accommodate any battery or batteries at the underside thereof. In this way, the front longitudinal members can continue into central longitudinal members, for which sufficient structural space is available at the underside of the second floor panel subassembly.

The front subframes that are used in both front-end subassemblies are for example at least partially structurally identical for the accommodation of the drive units, such that there are thus structurally identical aspects in motor vehicles with "combustion drive" and with "hybrid drive" for the accommodation of the combustion engine. Correspondingly, the front subframe for a motor vehicle with "electric drive" is adapted to the geometry of an electric motor arranged above the front subframe and/or to further components (for example control electronics, heating/cooling system, heat pump etc.).

Furthermore, the front subframes are at least partially structurally identical, for example in the region of the attachment of the battery or batteries, such that there are thus structurally identical aspects in motor vehicles with "hybrid drive" and "electric drive" with regard to the attachment of the battery or batteries. These front subframes are, by contrast to the front subframes for motor vehicles with "combustion drive", adapted to the absence of a central longitudinal member. For example, an additional shear panel may be provided here.

The two front-end subassemblies may have common components, such as radiator, brake unit, sound generator (for acoustic noticeability during electric operation of motor vehicles with "electric drive" and/or "hybrid drive"), sensors, struts, starter batteries, wiper system, washer system, water container, expansion tank etc.

The motor vehicles are configured with differently designed luggage compartment floor subassemblies in the rear-end region in accordance with the combination possibilities described further above.

A further aspect of the invention will be discussed below, which consists in that a uniform "body" (that is to say a uniform bodyshell structure with uniform external skin components) can be used for the motor vehicles with the different drive concepts. In order to be able to realize such a uniform body, "raising" of the motor vehicle (in relation to a conventional motor vehicle with "combustion drive") is necessary for all motor vehicles of one vehicle type, along with further measures (such as adaptation of the "silhouette", larger wheels, etc.), which will be discussed in more detail below.

In the case of the motor vehicles with "electric drive" and with "hybrid drive", the "raising" of the floor panel subassembly ensures sufficient ground clearance in the case of the motor vehicles with these two drive concepts, too, which have at least one battery arranged at the underside of the floor panel subassembly.

This sufficient ground clearance is achieved inter alia by virtue of the motor vehicles according to the invention of all three drive concepts having, at the front axle and/or at the rear axle, "wheel sizes" (this means the diameter of a wheel/tire combination) which have an enlarged diameter in relation to a similar motor vehicle with a "combustion drive". In this way, aside from the "raising" of the floor panel subassembly, the required higher wheel load in the case of the motor vehicles with "electric drive" and "hybrid drive", which is required owing to the weight of the battery or batteries, is also allowed for. A side effect here is however that, in the group of motor vehicles according to the invention, the motor vehicles with "combustion drive" also have wheels of larger dimensions than would be necessary for purely technical reasons. The reason for this is the realization of a uniform outer skin with uniform wheel apertures and with wheels "matching" these in the case of all motor vehicles of the group of motor vehicles according to the invention, irrespective of the drive concept.

For the invention, it is essential that the two floor panel subassemblies each have uniform attachment regions ("interfaces") to a bodyshell that is otherwise uniform, at least in subregions, for all three drive concepts. In other words, the attachment regions of the two floor panel subassemblies are designed such that they can, across all three drive concepts, be connected to a common front end (front-end subassembly) and/or a common rear end, also referred to as rear-end structure (luggage compartment floor subassembly). For example, the attachment regions of the floor panel subassemblies to the bulkhead, and the bulkhead itself, are designed in the manner described above.

With this concept, it is possible for the bodyshells of all motor vehicles of the group of motor vehicles according to the invention to be provided with a uniform outer skin, that is to say with uniform front side walls ("fenders"), uniform side walls with uniform door apertures, uniform roof paneling, uniform doors and/or uniform front and/or rear flaps.

In a further detail configuration, it is possible, in the sense of a standardization of the outer skin, to use the tank flap for the filling of fuel in the case of the motor vehicles with "combustion drive" to also be used, in the case of the motor vehicles with "electric drive", as a charging flap for an electric plug. It is likewise possible for the charging flap of the motor vehicles with "hybrid drive" to also be utilized as an additional charging flap for the motor vehicles with "electric drive".

The commonality of bodyshell and/or outer skin can advantageously also be continued in the interior equipment of the motor vehicles with the three drive concepts. For example, seats, instrument panel supports, instrument panels, central consoles and/or interior trim panels can be of common design.

Irrespective of the different embodiment of the two luggage compartment floor subassemblies, it is for example possible for the trim panels in the interior of the luggage compartment to be of identical design, for example the side trim panels.

It is furthermore advantageous if electrical components (for example loudspeakers, in particular subwoofers, amplifiers, current distributors, rear flap function module, trailer device) of the motor vehicles of at least two, ideally of all three, drive concepts are identically located, or at least the cable connection locations for the individual electrical components are identical.

By contrast, owing to the floor panel subassemblies at different "heights", the components underneath the seat plane, that is to say in particular seat transverse members and floor linings, are different for example in the case of the motor vehicles with "combustion drive", on the one hand, and in the case of the motor vehicles with "electric drive" or "hybrid drive", on the other hand, in order to realize a uniform seating position in the individual motor vehicles.

It is preferable for attachment parts to the bodyshell, for example front and/or rear bumpers, to have the same interfaces for installation in the motor vehicles of all three drive concepts. The attachment parts themselves may be geometrically identical or geometrically different. Different external designs of the rear bumper, for example, are used in a motor vehicle with "electric drive" because no exhaust system with a large-volume end muffler is present here. Analogously, the front bumpers may also be designed differently in accordance with the different cooling air requirement of the motor vehicles of the individual drive concepts. It is self-evidently also possible for the bumpers to be configured differently for design reasons, for example for the purposes of externally differentiating the motor vehicles of the individual drive concepts.

The invention furthermore has the advantage that the luggage compartment of the motor vehicles according to the invention with "hybrid drive" is not restricted by the accommodation of a battery or of a fuel tank. Thus, even in the case of motor vehicles with "hybrid drive", a luggage compartment is obtained which corresponds in terms of its size to the luggage compartment of motor vehicles with "combustion drive". In this way, the "hybrid drive" drive concept can be realized even with body variants of motor vehicles that do not have a sufficient luggage compartment volume for accommodating a battery or a fuel tank and/or which do not have a suitable geometrical design of the luggage compartment, such as coupes or cabriolets.

The invention can advantageously be applied to motor vehicles with "standard drive", that is to say with a longitudinally installed front-mounted engine and transmission assembly and drive of the rear wheels via a driveshaft, including the expansion to all-wheel drive by means of a transfer box for the drive of the front wheels, but is not limited to the "standard drive". In the case of motor vehicles with "combustion drive" with "standard drive", the mechanical drive for the motor vehicles with "hybrid drive" can be easily transferred by virtue of a "disk-shaped" electric motor being integrated into the transmission. The torque converter in the automatic transmission is omitted as a result of the integration the electric motor.

In the case of motor vehicles with "hybrid drive" with front-wheel drive by a combustion engine, the driveshaft to the rear axle is omitted, such that the region under the floor panel subassembly can be utilized virtually entirely for accommodating the battery or batteries. Here, the electric motor of the "hybrid drive" may likewise act on the front axle of the motor vehicle. Alternatively, in the case of a "road-coupled all-wheel drive vehicle" with front-wheel drive by a combustion engine, the electric motor is arranged in the rear end of the motor vehicle.

The invention makes it possible for motor vehicles with "combustion drive", with "electric drive" and with "hybrid drive" to be produced in a uniform production installation, wherein floor panel subassemblies of two different designs (and optionally luggage compartment floor subassemblies of two different designs) are used, which each have uniform attachment regions to a bodyshell that is otherwise uniform.

The method according to the invention for producing a group of motor vehicles according to claim 18 is distinguished by the fact that, to produce a group of motor vehicles with three different drive concepts ("combustion drive", "electric drive" and "hybrid drive"), only two different floor panel subassemblies and only two different luggage compartment floor subassemblies are used to form floor regions of the bodyshell structures of these different motor vehicles, which floor panel subassemblies and luggage compartment floor subassemblies are designed such that bodyshell structures for the motor vehicles with the three different drive concepts are formed through respective combination of one of the two floor panel subassemblies with one of the two luggage compartment floor subassemblies.

It is also possible "within" one of the three drive concepts considered in the context of the present invention to use different components of the exhaust system and/or different fuel tanks and/or different electric motors and/or different batteries in accordance with "motor/engine variant" (for example gasoline or diesel engine, motor/engine power, battery capacity) and/or drive type (front-wheel drive, rear-wheel drive, all-wheel drive) of the respective motor vehicle. It is self-evidently necessary for the two floor panel subassemblies and the two luggage compartment floor subassemblies to be designed correspondingly for these variants within one drive concept.

The position terms "front" and "rear", "top" and "bottom", "right" and "left" etc. used in the context of the present invention, and expressions derived therefrom, relate to the installed position of the respective components in the motor vehicle, and to the direction of travel of the motor vehicle during forward travel.

The present invention relates to the realization of an architecture of bodyshell structures for motor vehicles with the three drive concepts "combustion drive", "electric drive" and "hybrid drive". The invention also encompasses a group of motor vehicles of one vehicle type with three different drive concepts in which the drive concept "fuel cell", that is to say an electric motor drive with an electricity-generating unit fed with hydrogen, is provided instead of one of the three drive concepts mentioned above.

Possible exemplary embodiments of the invention are illustrated in the drawings and will be discussed in more detail below. FIG. 6 relates to an embodiment according to the prior art.

BRIEF DESCRIPTION OF THE DRAWINGS

FIGS. 2a, 2b, 2c are illustrations corresponding to FIG. 1 of three motor vehicles of one vehicle type with different drive concepts.

FIGS. 3a, 3b, 3c are schematic illustrations corresponding to FIGS. 2a, 2b, 2c of three motor vehicles of one vehicle type with different drive concepts, in each case as a cross section in accordance with the section line III-III in FIG. 1.

DETAILED DESCRIPTION OF THE DRAWINGS

Figure 1:
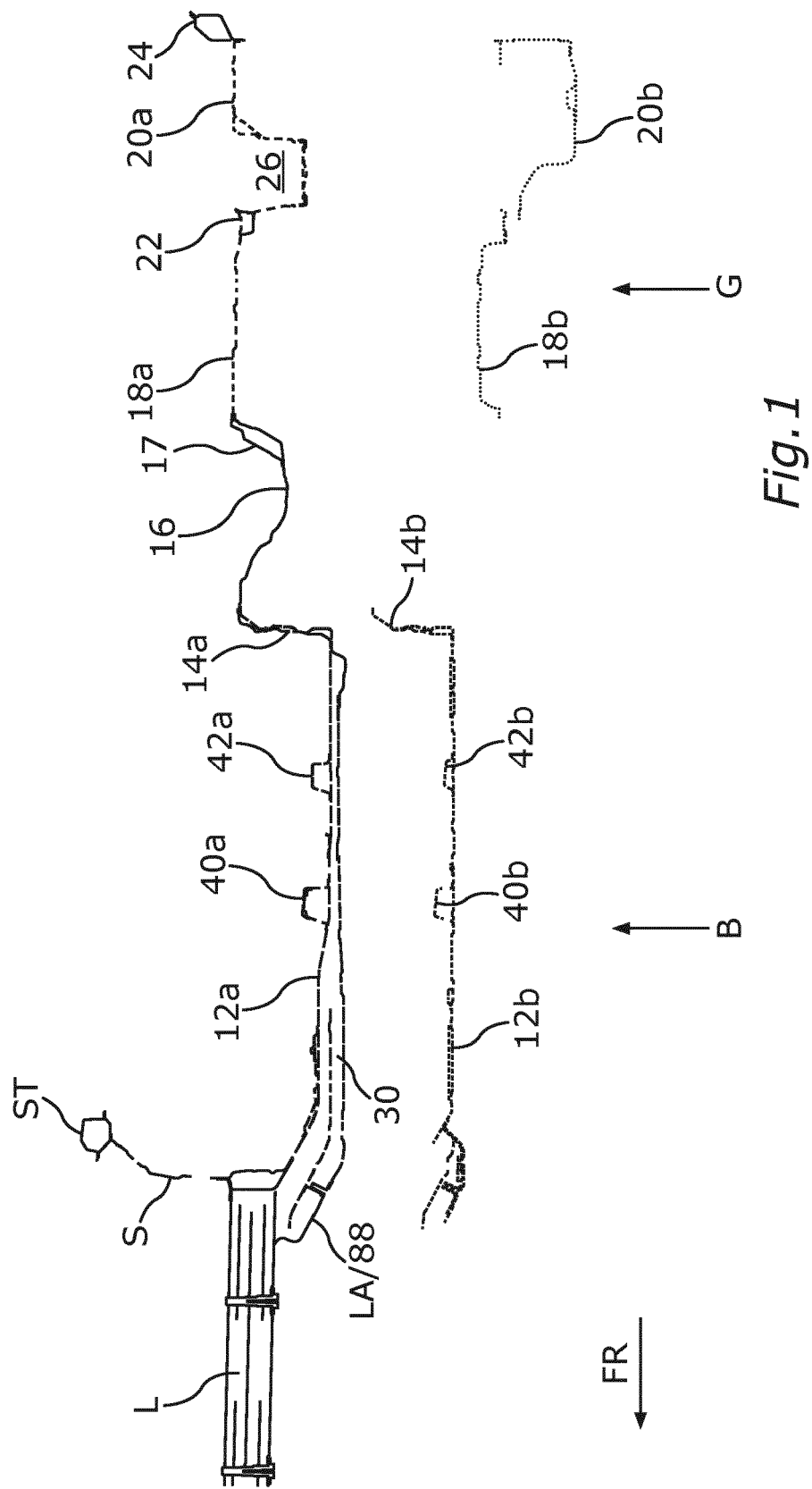
FIG. 1 is a schematic longitudinal section through a floor panel subassembly and through a luggage compartment floor subassembly of a motor vehicle in accordance with the section lines I-I in FIGS. 3a to 3c, for the purposes of illustrating the architecture of a group of motor vehicles of one vehicle type with different drive concepts.

FIGS. 1 to 5 show the bodyshell structure of motor vehicles in the floor region, also referred to as floor subassembly, that is to say in the region of front longitudinal members L (also referred to as engine bearers), of a floor panel subassembly B and of a luggage compartment floor subassembly G. Components of the bodyshell structure that are situated above the floor region are not illustrated, with the exception of a bulkhead S and an upper bulkhead member ST. The direction of travel of the motor vehicle during forward travel is denoted in FIGS. 1 and 5 by FR.

The bodyshell structures illustrated in FIGS. 1 to 5 belong to three motor vehicles of the same vehicle type. The three motor vehicles have three different drive concepts and form a group of motor vehicles according to the invention.

The three drive concepts are the drive with a combustion engine ("combustion drive", hereinafter also abbreviated to ICE), with an electric motor ("electric drive", hereinafter also abbreviated to BEV) and with a "hybrid drive" (herein also abbreviated to PHEV).

According to the invention, the motor vehicles of one vehicle type with the three drive concepts have bodyshell structures in the floor region that are formed by two different floor panel subassemblies B and two different luggage compartment floor subassemblies G. Corresponding combination of in each case one of the two floor panel subassemblies B with one of the two luggage compartment floor subassemblies G yields, overall, bodyshell structures for motor vehicles with the stated three drive concepts.

The individual bodyshell structures are illustrated using different types of line: the two different floor panel subassemblies B are illustrated using dashed lines with different dash lengths. The two different luggage compartment floor subassemblies G are illustrated using dotted lines and dashed lines respectively. Components of the bodyshell structures that are uniform for the motor vehicles of all three drive concepts, hereinafter also referred to as common components, are illustrated using solid lines.

Using the terminology of the patent claims, the individual subassemblies are illustrated as follows:
first floor panel subassembly B using closely dashed lines
second floor panel subassembly B using widely dashed lines
first luggage compartment floor subassembly G using dotted lines and second luggage compartment floor subassembly G using dashed lines.

Two different deep-drawing tools (or tool sets) are provided for the production of the two floor panel subassemblies B. Likewise, two further different deep-drawing tools (or tool sets) are provided for the production of the two luggage compartment floor subassemblies G.

The alphabetic characters a and b added as suffixes to the reference numerals in the drawing denote components of the bodyshell structures that have been produced using a first deep-drawing tool or a second deep-drawing tool, which is different than the first.

FIG. 1 and FIGS. 2a, 2b and 2c show the floor region of the group of motor vehicles according to the invention in longitudinal section, beginning at the front vehicle section with the front longitudinal member L, of which only a central and a rear section are illustrated. The region of the rear end section of the front longitudinal member L is adjoined by the bulkhead S, with its bulkhead member ST at the top. The front longitudinal members L are formed for example by an extruded profile.

The course of the section is denoted in FIGS. 3a, 3b and 3c by the section course lines I-I. Accordingly, FIG. 1 and FIGS. 2a, 2b and 2c each illustrate the section through the right-hand half of the floor region. The left-hand half of the floor region is of substantially axially symmetrical design.

Whilst FIG. 1 illustrates the concept of an architecture with bodyshell structures for different drive concepts, FIGS. 2a, 2b and 2c individually illustrate the bodyshell structures, assembled from the "modules" of FIG. 1, of the three motor vehicles with the different drive concepts. FIG. 2a shows the floor region of a motor vehicle with "combustion drive", FIG. 2b shows the floor region of a motor vehicle with "hybrid drive", and FIG. 2c shows the floor region of a motor vehicle with "electric drive". The respective drive units are not illustrated in FIGS. 2a, 2b and 2c.

In accordance with the section course lines I-I, FIG. 1 and FIGS. 2a, 2b and 2c illustrate the region of a right-hand floor panel section 12a or 12b. The approximately horizontally running floor panel sections 12a or 12b transition at a rear side into approximately vertically running heel plates 14a and 14b. These are adjoined by a common region of a seat well 16, followed by a likewise common "front transverse member, rear axle" 17. This is subsequently adjoined by a front luggage compartment floor 18a or 18b, a rear luggage compartment floor 20a or 20b and a common rear-end terminating member 24. A common "rear transverse member, rear axle" 22 is provided between the front luggage compartment floor 18a or 18b and the rear luggage compartment floor 20a or 20b.

Front seat transverse members 40a or 40b and rear seat transverse members 42a or 42b are mounted onto the floor panel sections 12a or 12b.

All motor vehicles according to the invention—irrespective of the drive concept—have in common the fact that the front longitudinal members L end with their rear end sections in the region of the bulkhead S. In this region, attachment parts LA are mounted onto the undersides of the rear end sections of the front longitudinal members. Furthermore, in all motor vehicles according to the invention, supports 88 may be provided which run in a transverse direction of the motor vehicles and which support the region of the rear end sections of the front longitudinal members L and/or of the attachment parts with respect to the side longitudinal members (sills) 32a or 32b. This construction will be described once again on the basis of FIGS. 15 and 16a to 16d.

As per FIG. 2a, in the case of the motor vehicle with "combustion drive", the drive unit is arranged in the region of the front longitudinal members L. Via attachment parts LA which are mounted onto the underside of the front longitudinal members L that end in the region of the bulkhead S, the front longitudinal members L continue in central longitudinal members 30 at the underside of the floor panel section 12a. A fuel tank 50 with a relatively large storage capacity is arranged in the region under the seat well 16. A rear axle (not illustrated) is situated underneath the front luggage compartment floor 18a. The rear luggage compartment floor 20a has a depression 26, in which control units, for example, are accommodated.

As per FIG. 2b, in the case of the motor vehicle with "hybrid drive", a combustion engine (possibly as a structural unit with an electric motor) is arranged in the region of the front longitudinal members L. The front longitudinal members L end in the region of the bulkhead S and, at their rear end sections, have the abovementioned attachment parts LA and the supports 88. The front longitudinal members L are not continued at the underside of the floor panel section 12b of the floor panel subassembly. The floor panel sections 12b are situated higher than the floor panel sections 12a in order to provide, at their underside, the structural space required for batteries 60. Accordingly, the front and the rear seat transverse members 40b and 42b have a smaller height extent than the front and the rear seat transverse members 40a and 42a as per FIG. 2a, so as to allow identical positioning of the front seats in both motor vehicles. A fuel tank 52 is situated in the region under the seat well 16, the storage capacity of which fuel tank is reduced in relation to the fuel tank 50 owing to the batteries 60 which projects beyond the heel plate 14b counter to the direction of travel FR. owing to the floor panel sections 12b that are arranged at a higher level in relation to the floor panel sections 12a of the motor vehicle as per FIG. 2a, the heel plate 14b in the motor vehicle as per FIG. 2b has a smaller height extent than the heel plate 14a. A rear axle (not illustrated) is situated underneath the front luggage compartment floor 18a. The rear luggage compartment floor 20a likewise has a depression 26, in which control units, for example, are accommodated.

As per FIG. 2c, in the case of the motor vehicle with "electric drive" (purely electric drive), an electric motor (not illustrated) is arranged underneath the front luggage compartment floor 18b. The region between the front longitudinal members L may remain free from a drive unit, and may accordingly be utilized for example as a luggage compartment or as an accommodating space for control units. Aside from the electric motor in the region underneath the front luggage compartment floor 18b, it is self-evidently also possible for an additional electric motor to be provided in the region between the front longitudinal members L in order to realize electric all-wheel drive. As in the motor vehicle with "hybrid drive" as per FIG. 2b, it is also the case in the motor vehicle with "electric drive" that the front longitudinal members L end in the region of the bulkhead S, without continuation at the underside of the floor panel section 12b.

At the underside of the floor panel sections 12b, which are situated at a higher level (in relation to the floor panel sections 12a), there is arranged a battery 62 which projects into the region under the seat well 16. The seat transverse members 40b and 42b and heel plate 14b correspond to the components of the bodyshell structure as per FIG. 2b.

The front luggage compartment floor 18b is arranged considerably higher than the front luggage compartment floor 18a. In this way, at the underside of the front luggage compartment floor 18b, a structural space is provided for a rear axle (not illustrated) and for the abovementioned electric motor. The usable luggage compartment above the front luggage compartment floor 18b is smaller than in the case of the motor vehicle with the front luggage compartment floor 18a.

The rear luggage compartment floor 20b has (instead of the depression of the rear luggage compartment floor 20a), a bulged portion 27 for providing the required structural space for the components of the motor vehicle with "electric drive". The bulged portion 27 is adjoined by a relatively large depression 28, which allows a larger luggage compartment volume in this rear region of the luggage compartment than in the case of the rear luggage compartment floor 20a. The depression 28 in the rear luggage compartment floor 20b is made possible by the omission of an exhaust system. In relation to this, the rear luggage compartment floor 20a as per FIGS. 2a and 2b runs at a relatively high level in the rear region owing to the end muffler positioned under it.

For the screw connection of the batteries 60 of the motor vehicle with "hybrid drive" (FIG. 2b), brackets 66 are provided on the front end sections of the batteries 60 for the purpose of screw connection to the bodyshell structure in the region of the rear end sections of the front longitudinal members L "at the level" of the bulkhead S, that is to say in the region of a Y-Z plane (transverse/vertical plane) of the motor vehicle that is spanned by the bulkhead. For this purpose, it is for example the case that four screw connection points V are provided at each side of the vehicle. Since the rear end sections of the front longitudinal members L do not continue at the underside of the floor panel subassembly, the transmission of the forces from the front longitudinal members L takes place via the brackets 66 into the housings of the batteries 60.

Correspondingly, for the screw connection of the battery 62 of the motor vehicle with "electric drive" (FIG. 2c), brackets 68 are arranged on the front end section of the battery 62, which brackets are likewise connected to the bodyshell structure in the region of the rear end sections of the front longitudinal members L. Here, it is for example the case that five screw connection points V to the bodyshell structure, and two screw connection points V to the front subframe 70b (see FIG. 13), are provided at each side of the vehicle.

It is demonstratively shown in FIG. 1 and FIGS. 2a, 2b and 2c how, according to the method according to the invention, bodyshell structures of motor vehicles of one vehicle type with three different drive concepts can be formed from two floor panel subassemblies B and two luggage compartment floor subassemblies G.

FIGS. 3a, 3b and 3c show the floor region of a motor vehicle with "combustion drive" and the floor region of a motor vehicle with "hybrid drive" and the floor region of a motor vehicle with "electric drive" respectively, in each case in cross section, in accordance with the section course line III-III in FIG. 1. The respective drive units are not illustrated in FIGS. 3a, 3b and 3c.

FIG. 3a shows the following components of the bodyshell structure: left-hand and right-hand floor panel section 12a, left-hand and right-hand central longitudinal members 30, left-hand and right-hand tunnel longitudinal reinforcement 31, left-hand and right-hand front seat transverse members 40a, screw connection points 29 for the attachment of a left-hand and of a right-hand seat rail, left-hand and right-hand side longitudinal members (sills) 32a, central tunnel 36a, and tunnel top panel 38. The sills 32a are made up of predominantly vertically running sections 33a and horizontally running sections 34a.

At the inner side of the central tunnel 36a, there is provided at least one tunnel reinforcement 90 (see FIG. 5), which is however not visible in FIG. 3a owing to the position of the section course line III-III. The free space 37a within the central tunnel 36a serves for example for accommodating a driveshaft and/or an exhaust line (neither of which is illustrated). An underbody paneling (not illustrated) is provided underneath the floor panel sections 12a.

Figure 5:
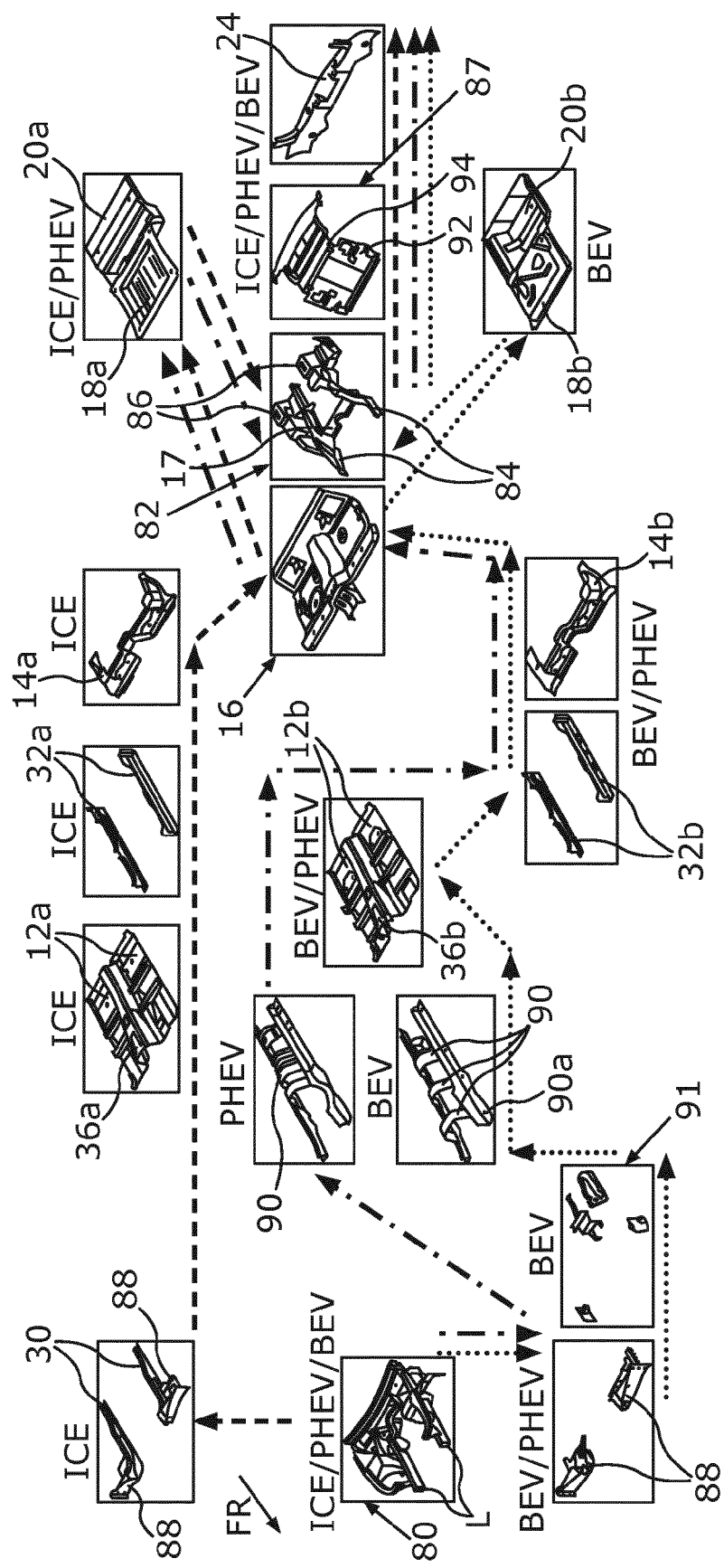
FIG. 5 is a schematic illustration of the architecture of a group of motor vehicles of one vehicle type with different drive concepts, illustrating individual components of the bodyshell structure in a perspective illustration, in the form of a flow diagram for the production of the three different motor vehicles.

The tunnel reinforcement 90 is configured as a U-shaped sheet-metal component which is mounted directly onto the underside of, and connected by spot welding to, the central tunnel 36a or 36b, which is configured as a sheet-metal component. This sheet-metal design can be seen in particular from FIGS. 16b and 16c on the basis of the example of the central tunnel 36b. As is also illustrated in FIG. 5, in the example of the "PHEV" and of the "BEV", a total of three of these tunnel reinforcements 90 are provided. The free limbs of the U-shaped tunnel reinforcements 90 are connected to members 90a which run in a longitudinal direction (corresponds to the direction of travel FR) of the motor vehicle and which are composed of a sheet-metal material. The tunnel reinforcements 90 are not illustrated in FIG. 5 for the "ICE", but are present in similar form and number. For example, both in the case of the motor vehicles with "combustion drive" and in the case of the motor vehicles with "hybrid drive", a uniform tunnel reinforcement 90 is provided in the region of the bearing for the drive shaft AW. There are also further corresponding features in the motor vehicles with the three drive concepts with regard to the tunnel reinforcements 90, but also different tunnel reinforcements 90. Since the tunnel reinforcements 90 are of only secondary importance for the invention, no further differentiation will be made in this regard.

FIGS. 3b and 3c show the following components of the bodyshell structure: left-hand and right-hand floor panel section 12b, left-hand and right-hand front seat transverse member 40b, screw connection points 29 for a left-hand and a right-hand seat rail, left-hand and right-hand side longitudinal members (sills) 32b, central tunnel 36b, and tunnel top panel 38. The sills 32b are made up of predominantly vertically running sections 33b and horizontally running sections 34b. At least one tunnel reinforcement 90 is provided at the inner side of the central tunnel 36b (see also FIG. 5).

The free space 37b within the tunnel 36b as illustrated in FIG. 3b serves for example for accommodating a driveshaft and/or an exhaust line (neither of which is illustrated). In FIG. 3b, in each case one battery 60 is provided underneath the left-hand and the right-hand floor panel section 12b. The batteries 60 have brackets 61 on the outer side, which brackets are screwed to the sections 34b of the sills 32b. Further screw connection points of the batteries 60 to the bodyshell structure of the motor vehicle are not illustrated.

The free space 37b within the central tunnel 36b as illustrated in FIG. 3c serves for example for accommodating lines for a cooling medium and/or electrical lines (not illustrated). In FIG. 3c, underneath the floor panel sections 12b, a battery 62 extends over the entire width of the underbody, which battery projects with a bulged portion 64 into the free space 37b of the central tunnel 36b. The battery 62 has brackets 63 at both outer sides, which brackets are screwed to the sections 34b of the sills 32b. Further screw connection points of the battery 62 to the bodyshell structure of the motor vehicle are not illustrated.

The central tunnels 36a and 36b are of geometrically uniform design in their upper region and can thus, at their top side, accommodate the commonly configured tunnel top panel 38. The tunnel top panel 38 serves for the attachment of a central console (not illustrated) in the passenger compartment of the individual motor vehicles with the different drive concepts.

It is demonstratively shown in the illustration of FIGS. 3a to 3c that the motor vehicles according to the invention—irrespective of the drive concept—have a central tunnel 36a or 36b which is of common configuration in its upper region, which central tunnel is equipped at its inner side with uniform and/or specific tunnel reinforcements 90. With these tunnel reinforcements 90 designed as "adaptation parts", the specific requirements of the motor vehicles are satisfied in accordance with the drive concept, whilst achieving the most extensive possible commonality of the bodyshell structure.

The cross sections of FIGS. 3a, 3b and 3c illustrate, in conjunction with the longitudinal sections as per FIGS. 2a, 2b and 2c, how bodyshell structures of motor vehicles of one vehicle type with three different drive concepts can be assembled from two floor panel subassemblies B and two luggage compartment floor subassemblies G.

Figure 4A:
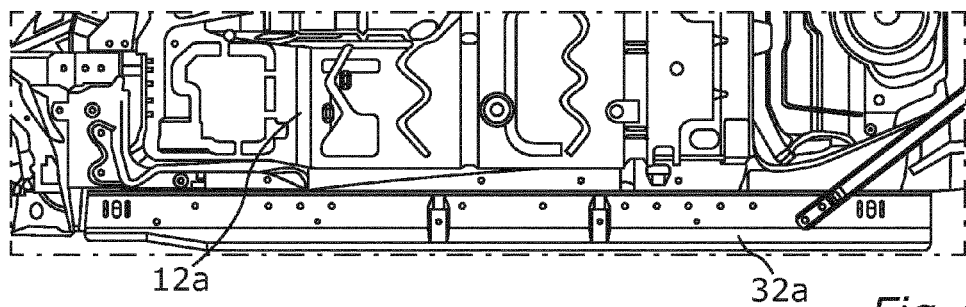
FIGS. 4a, 4b, 4c are views from below of the floor panel subassembly of three motor vehicles with different drive concepts.
Figure 4B:
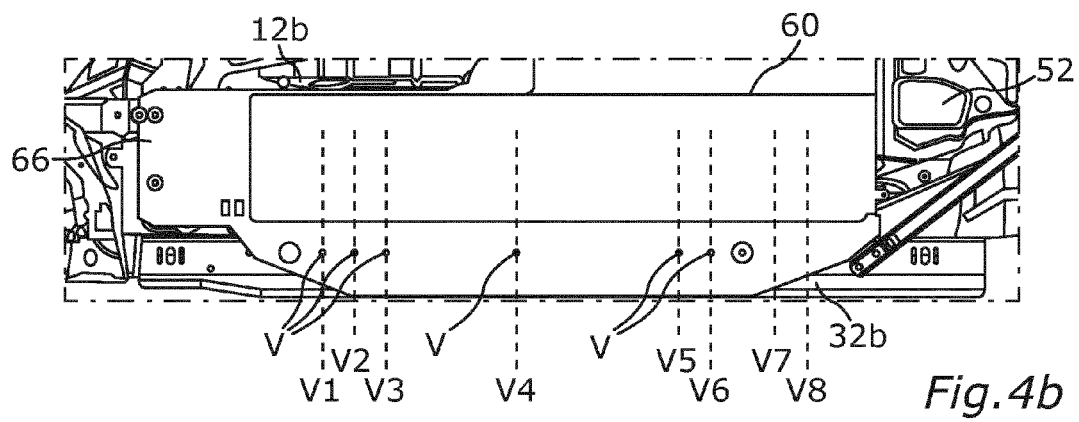
Figure 4C:
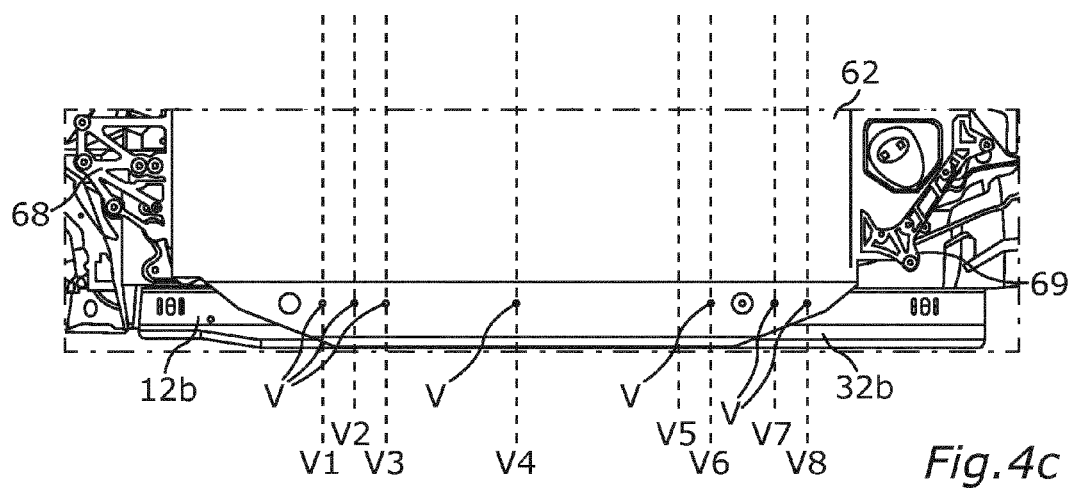

FIGS. 4a, 4b and 4c show views from below of the floor region of a motor vehicle with "combustion drive" and the floor region of a motor vehicle with "hybrid drive" and the floor region of a motor vehicle with "electric drive" respectively.

FIG. 4a shows a view of the underbody of a motor vehicle with "combustion drive", without an underbody paneling being illustrated. The motor vehicle with "combustion drive" has no battery on the underbody.

FIGS. 4b and 4c illustratively show the differences, already illustrated in FIG. 3b and FIG. 3c, between firstly the two batteries 60 (for a motor vehicle with "hybrid drive") and secondly the battery 62 that extends over approximately the entire vehicle width (for a motor vehicle with "electric drive"), and the different attachment thereof to the sills 32b, in a view of the underbody from below. Furthermore, FIGS. 4b and 4c illustrate the attachment of the front end sections of the batteries 60 and of the batteries 62 respectively to the front region of the floor panel section 12b, approximately at the level of the bulkhead S. The fuel tank 52 is also illustrated in FIG. 4b.

Multiple screw connection points V are provided at each side of the vehicle on the horizontal sections 34b of the sills 32b. Lines V1 to V8 which run continuously between FIGS. 4b and 4c and which connect the individual screw connection points V in an aligned manner in a vehicle transverse direction illustrate that the screw connection points V are positioned identically in relation to the vehicle longitudinal direction along the lines V1 to V8 in the case of the motor vehicle with "hybrid drive" (FIG. 4b) and in the case of the motor vehicle with "electric drive" (FIG. 4c). Furthermore, with respect to the vehicle transverse direction, the screw connection points V are also positioned with in each case identical spacings to the central longitudinal plane of the bodyshell structures of the two different motor vehicles.

For the screw connection between the sills 32b of each side of the vehicle and the batteries 60 of the motor vehicle with "hybrid drive" (FIG. 4b), screw connection points V are provided along the lines V1 to V6, that is to say a total of six screw connection points V at each side of the vehicle.

The screw connection between the sills 32b of each side of the vehicle and the batteries 62 of the motor vehicle with "electric drive" (FIG. 4c) is realized by means of screw connection points V along the lines V1 to V4 and by means of the screw connection points V along the lines of V5 to V8, that is to say by means of a total of seven screw connection points V at each side of the vehicle.

The attachment of the batteries 60 and 62 in their front region, as already described in conjunction with FIGS. 2b and 2c, is demonstratively shown particularly clearly in the view from below in FIGS. 4b and 4c. For the fastening of the batteries 60 of the motor vehicle with "hybrid drive" (FIG. 4b), left-hand and right-hand brackets 66 are provided on the front end sections of the batteries 60, which brackets are screwed to the bodyshell structure in the region underneath the bulkhead S. Correspondingly, for the fastening of the battery 62 of the motor vehicle with "electric drive" (FIG. 4c), left-hand and right-hand brackets 68 are arranged on the front end section of the battery 62, which brackets are screwed to the bodyshell structure in the region underneath the bulkhead S.

For the fastening of the batteries 60 and 62 in the side regions of the bodyshell structure of the body of the motor vehicles, the patterns of holes of all screw connection points V are coordinated with one another so as to correspond to the patterns of holes on the brackets 61 and 63 of the batteries 60 and 62. In other words, the individual screw connection points V are positioned either so as to be congruent for the brackets 61 and 63 of the batteries 60 and 62 or so as to be situated so far apart that two mutually independent screw connection points V can be realized. By contrast, an overlap of screw connection points V is ruled out, and it is also ruled out that screw connection points V are situated so close together that, for adjacent screw connection points V, there is not sufficient load-bearing material available to ensure a stable screw connection.

Analogously, for the fastening of the batteries 60 and 62 in the region of the bulkheads S of the respective motor vehicles, the patterns of holes of all screw connection points V on the bodyshell structure are configured so as to correspond to the patterns of holes on the brackets 66 and 68 of the batteries 60 and 62. Here, the principle already discussed above on the basis of the screw connection of the batteries 60 and 62 to the side longitudinal members 32a and 32b is taken as a basis, according to which a multiplicity of screw connection points is provided which are partially common to the brackets 66 and 68 of the two batteries 60 and 62 and are partially used only by in each case one of the brackets 66 and 68.

The fastening of the battery or batteries 60 or 62 to the bodyshell structure is realized in the region of the end sections of the front longitudinal members L and/or of the attachment parts LA and/or of the supports 88.

The screw connection points on the common rear-end longitudinal members 84 are utilized for the fastening of the rear end sections of the batteries 60 or 62 to the rear-end structure of the motor vehicle.

For the purposes of illustration and of specifying exemplary details of the method according to the invention for producing motor vehicles of one vehicle type with three different drive concepts, FIG. 5 shows a flow diagram with which the "paths" of the assembly of the components of the bodyshell structures will be discussed below, without any more detailed discussion of the structural features of the individual components. Here, the arrows with dashed lines are the path for the production of motor vehicles with "combustion drive", the arrows with dash-dotted lines are assigned to the path for the production of motor vehicles with "hybrid drive", and the arrows with dotted lines are assigned to the path for the production of motor vehicles with "electric drive". Here, the abbreviations ICE, PHEV and BEV discussed above are used in FIG. 5.

With regard to the path of the production of the motor vehicles with "combustion drive" (ICE): at a front-end structure 80, the longitudinal members L are, via the attachment parts LA (not illustrated) and the supports 88, adjoined counter to the direction of travel FR by the central longitudinal members 30, which are welded to the underside of the floor panel sections 12a. The floor panel sections 12a are joined to the central tunnel 36a and to the sills 32a to form the floor panel subassembly B, and are supplemented by the heel plate 14a.

This is adjoined by the seat well 16, which is common to all motor vehicles of the group according to the invention.

Adjoining this further counter to the direction of travel FR is the luggage compartment floor subassembly G, which is made up, at the top side, of the front and the rear luggage compartment floor 18a and 20a respectively. At the underside, the luggage compartment floor subassembly G is supplemented by a rear-end member structure 82. The rear-end member structure 82 has left-hand and right-hand rear-end longitudinal members 84 and left-hand and right-hand rear suspension strut receptacles 86 and is covered by a "partition assembly" 87 with a partition 92 and a rear shelf 94. The two rear-end longitudinal members are connected to one another by the "front transverse member, rear axle" 17. At the rear side, the floor-side bodyshell structure is terminated with the rear-end terminating member 24.

With regard to the path of the production of the motor vehicles with "hybrid drive" (PHEV): the front-end structure 80 with its front longitudinal members L is adjoined, counter to the direction of travel FR by the attachment parts LA (not illustrated) and the supports 88, which serve for accommodating the brackets 66 of the batteries 60. The floor panel sections 12b are joined to the central tunnel 36b and the sills 32b to form the floor panel subassembly B and are supplemented by the heel plate 14b. The central tunnel 36b is equipped at the underside with tunnel reinforcements 90, which are supplemented by members 90a.

This is adjoined by the seat well 16 as a common component.

Adjoining this further counter to the direction of travel FR is the luggage compartment floor subassembly G, which is made up, at the top side, of the front and the rear luggage compartment floor 18a and 20a respectively. At the underside, the luggage compartment floor subassembly G is supplemented by the common subassemblies "rear-end member structure" 82 and "partition assembly" 87. At the rear side, the bodyshell structure is terminated with the rear-end terminating member 24.

With regard to the path of the production of the motor vehicles with "electric drive" (BEV): the front-end structure 80 with its front longitudinal members L is adjoined by the attachment parts LA (not illustrated) and the supports 88 to the rear end sections. This region serves for accommodating the brackets 68 of the battery 62.

This is subsequently followed by holders 91. The holders 91 are component specific to the "electric drive" drive concept, which supplement the common components.

The floor panel sections 12b are joined to the central tunnel 36b and the sills 32b to form the floor panel subassembly B and are supplemented by the heel plate 14b. The central tunnel 36b is equipped, at the underside, with tunnel reinforcements 90, which are in part designed differently to the tunnel reinforcements 90 of the motor vehicles with "combustion drive" and/or with "hybrid drive".

This is adjoined by the seat well 16 as a common component.

Adjoining this further counter to the direction of travel FR is the luggage compartment floor subassembly G, which is made up, at the top side, of the front and the rear luggage compartment floor 18b and 20b respectively and in this way provides a luggage compartment which is designed differently in relation to the motor vehicles with "combustion drive" or with "hybrid drive". The luggage compartment floor subassembly G is furthermore supplemented by the common subassemblies "rear-end member structure" 82 and "partition assembly" 87, as described above.

Figure 6:
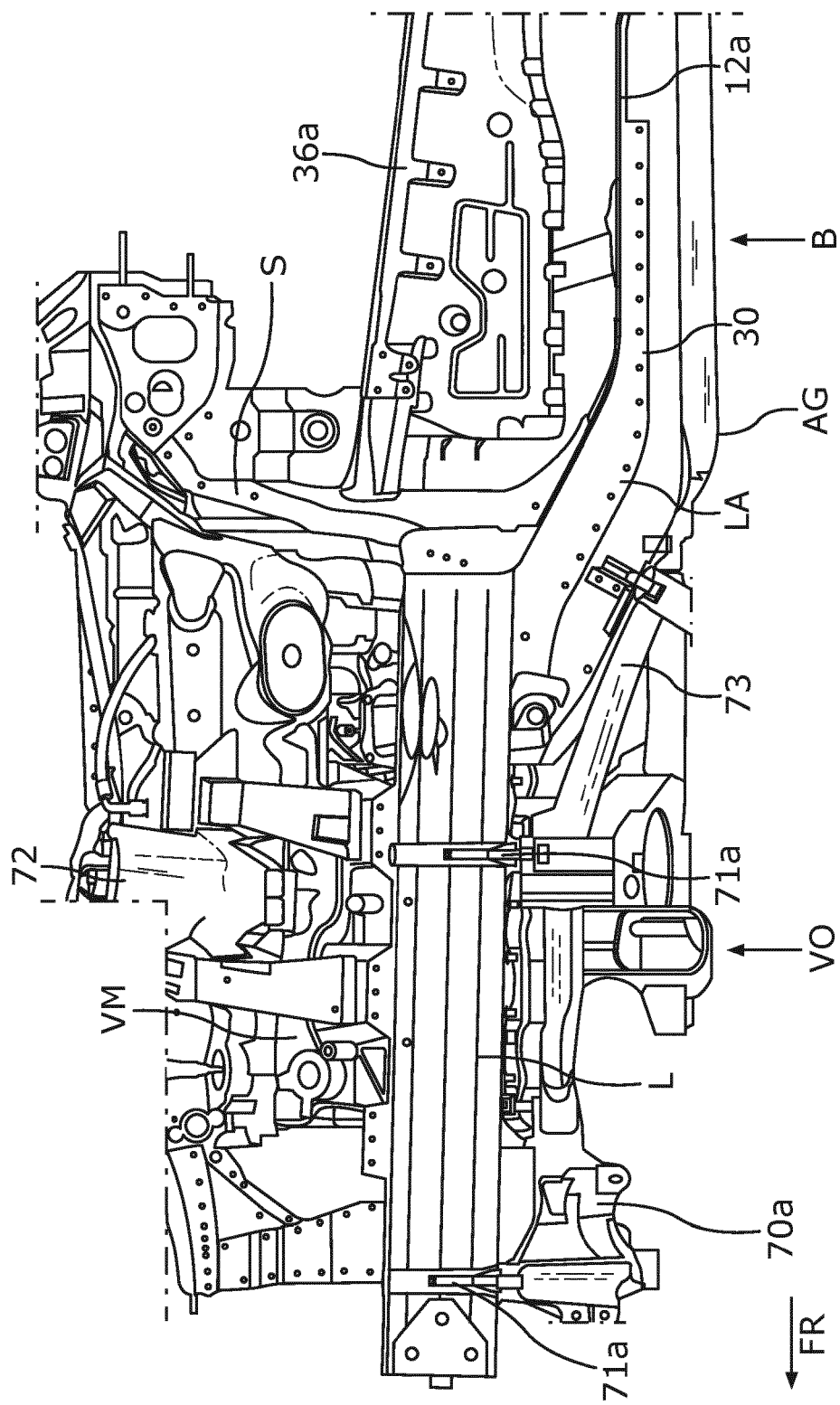
FIG. 6 is a sectional illustration through the front-end structure of a motor vehicle with "combustion drive".
Figure 7:
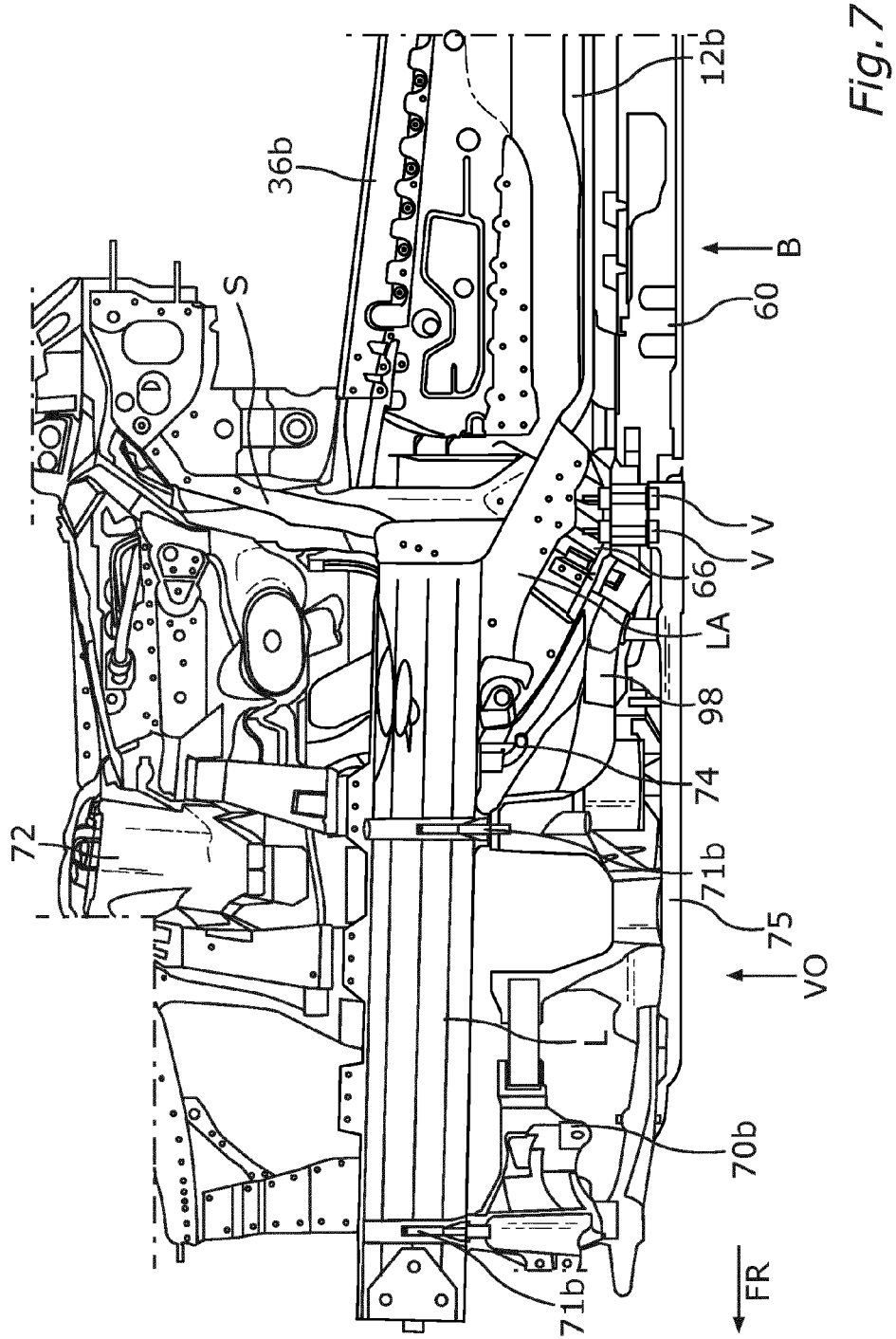
FIG. 7 is an illustration corresponding to FIG. 6 of a motor vehicle with "hybrid drive".
Figure 8:
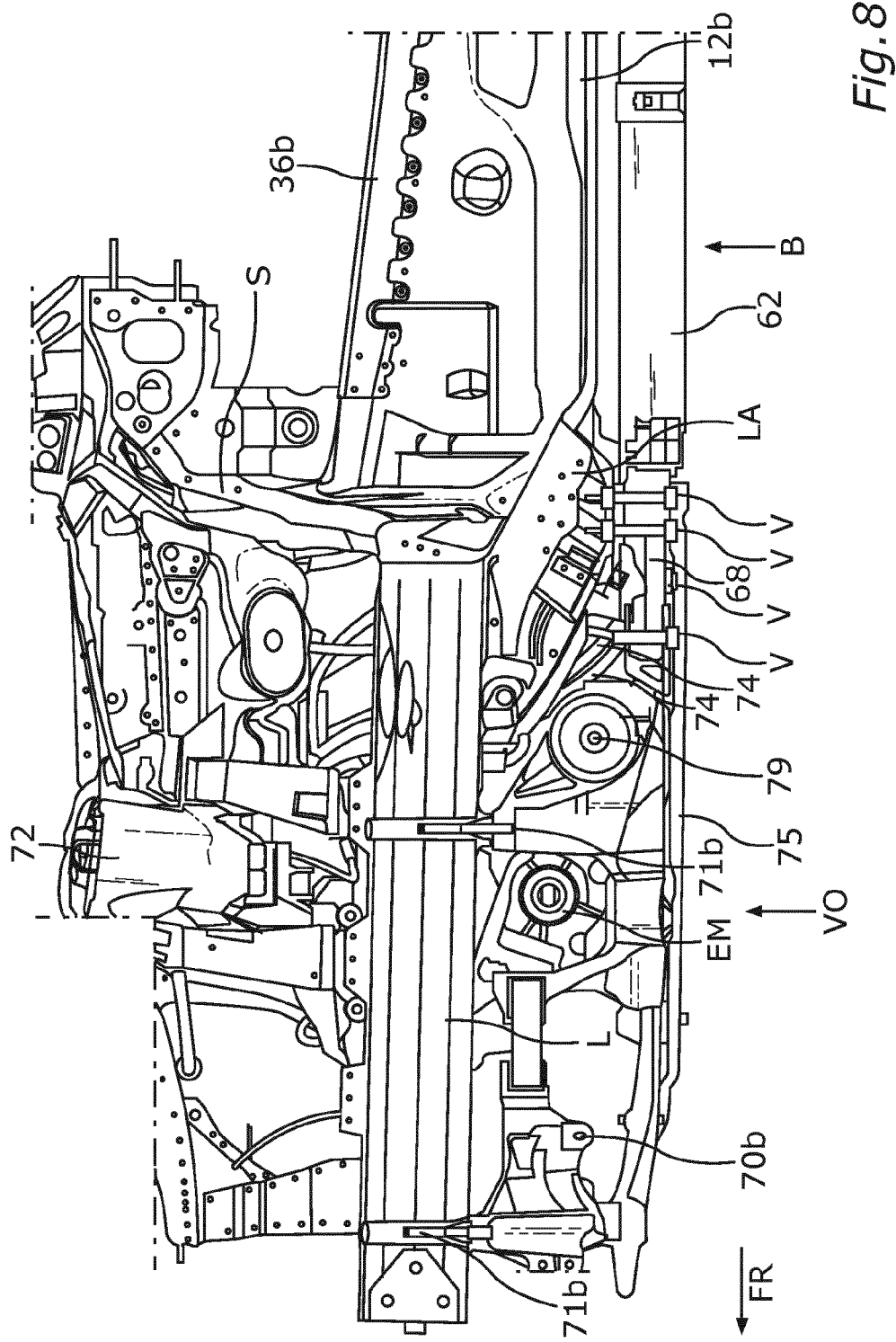
FIG. 8 is an illustration corresponding to FIG. 6 of a motor vehicle with "electric drive".

FIGS. 6 to 8 explain the invention further.

FIG. 6 illustrates a longitudinal section in the left-hand region of the front-end structure of a motor vehicle according to the invention with "combustion drive", with a second front-end subassembly VO. The right-hand side of the front-end structure is of mirror-symmetrical construction. FIG. 6 also shows the floor region of the bodyshell structure that is adjacent counter to the direction of travel FR, with a second floor panel subassembly B. The second front-end subassembly VO has, inter alia, front longitudinal members L, a front subframe 70a, front suspension strut receptacles 72 and further components of the bodyshell structure that are not denoted in any more detail. The front longitudinal members L bear a combustion engine VM. The front subframe 70a is attached via bushings 71a to the front longitudinal members L. A bulkhead S forms the transition from the front-end structure to the floor region of the passenger cell. Here, the illustration shows inter alia a floor panel section 12a and a central tunnel 36a with an automatic transmission AG arranged therein.

In a known manner, the front longitudinal members L continue, at their rear end sections, into central longitudinal members 30. The central longitudinal members 30 extend beyond the bulkhead S counter to the direction of travel FR along the underside of the floor panel sections 12a. The central longitudinal members 30 are preferably connected to the floor panel sections 12a by spot welding. Furthermore, cantilevers 73 of the front subframe 70a extend rearward and transmit the forces from the chassis, or the forces that arise in the event of a crash, via the end sections of the front longitudinal members L and/or the attachment parts LA into the central longitudinal members 30. Furthermore, forces are introduced into the side longitudinal members 32a via the supports 88.

FIG. 7 illustrates a longitudinal section in the left-hand region of the front-end structure of a motor vehicle according to the invention with "hybrid drive", with a first front-end subassembly VO. The right-hand side of the front-end structure is of mirror-symmetrical construction. FIG. 7 also shows the floor region of the bodyshell structure that is adjacent counter to the direction of travel FR, with a first floor panel subassembly B. The first front-end subassembly VO has, inter alia, front longitudinal members L, a front subframe 70b and front suspension strut receptacles 72. The front longitudinal members L bear a combustion engine (not illustrated) as a structural unit with an electric motor. The front-axle support 70b is attached via bushings 71b to the front longitudinal members L. A bulkhead S forms the transition from the front-end structure to the floor region of the passenger cell. Here, the illustration shows inter alia a floor panel section 12b and a central tunnel 36b. Underneath the floor panel section 12b, batteries 60 are arranged to both sides of the central tunnel 36b. Also shown are lines 74 that lead from the front-end structure to the batteries 60.

The front longitudinal members L end with their rear end sections in the region of the bulkhead S. The undersides of the rear end sections of the front longitudinal members L, and/or the attachment parts LA arranged there, and/or the supports 88, serve for the fastening of the batteries 60. For this purpose, brackets 66 are provided on the front end sections of the batteries 60. The screw connection points are denoted by V. Furthermore, underneath the front subframe 70b, there is provided a shear panel 75 which stiffens the front subframe 70b and which is screwed to the brackets 66.

The front-end structure of the motor vehicle with "hybrid drive" is accordingly altogether similar, in its upper region, to the front-end structure of the motor vehicle with "combustion drive", whereas, in its lower region, it corresponds to the motor vehicle with "electric drive".

FIG. 8 illustrates a longitudinal section in the left-hand region of the front-end structure of a motor vehicle with "electric drive", with a first front-end subassembly VO. FIG. 14 also shows the floor region of the bodyshell structure that is adjacent counter to the direction of travel FR, with a first floor panel subassembly B. The first front-end subassembly VO corresponds to the front-end subassembly VO illustrated in FIG. 7, with front longitudinal members L, a front subframe 70b and a front suspension strut receptacle 72. The front longitudinal members L bear an electric motor EM. The electric motor EM is on the one hand supported via bearings 79 on the front subframe 70b and is on the other hand mounted via cantilevers on further bearing points at the level of the inner side of the longitudinal member L (and thus in a manner which is not visible in FIG. 14). The front subframe 70b is attached via bushings 71b to the front longitudinal members L. A bulkhead S forms the transition from the front-end structure to the floor region of the passenger cell, with a floor panel section 12b and a central tunnel 36b. Underneath the floor panel section 12b, there is arranged a battery 62 which extends over approximately the entire width of the floor panel section 12b. Also shown are lines 74 that lead from the front-end structure to the battery 62.

The front longitudinal members L end with their rear end sections in the region of the bulkhead S. The undersides of the rear end sections of the front longitudinal members L, and/or the attachment parts LA arranged there, and/or the supports 88, serve for the fastening of the battery 62. For this purpose, brackets 68 are provided on the front end section of the battery 62. The screw connection points are denoted by V. Furthermore, underneath the front subframe 70b, there is provided a shear panel 75 which stiffens the front subframe 70b and which is screwed to the brackets 68.

Fewer screw connection points V are required in the case of the motor vehicles with "hybrid drive" as per FIG. 7 than in the case of the motor vehicles with "electric drive" as per FIG. 8, because the batteries 60 of the motor vehicle with "hybrid drive" can additionally be supported in the central region of the floor panel subassembly B.

The brackets 66 and 68 respectively arranged on the batteries 60 and 62 are dimensioned in accordance with the loading (weight of the batteries, number of screw connection points V).

The invention can be summarized as follows: to produce different motor vehicles of one vehicle type which have different drive concepts ("combustion drive", "electric drive" or "hybrid drive"), two different floor panel subassemblies B and two different luggage compartment floor subassemblies G are provided. The two subassemblies B and G are produced in each case using different deep-drawing tools. All three motor vehicles, that is to say motor vehicles of all three drive concepts, can be produced through respective combination of one of the two floor panel subassemblies B with one of the two luggage compartment floor subassemblies G.

Furthermore, "considered from another perspective", the invention may furthermore also be characterized by the fact that the "architecture" of the motor vehicles with "electric drive" is used as a basis for realizing the motor vehicles with "hybrid drive". Here, to produce motor vehicles of one vehicle type with the three abovementioned drive concepts, two different floor panel subassemblies B are provided, wherein a first floor panel subassembly B is, in its installed position in the motor vehicle, arranged at a higher level than the second floor panel subassembly B. The floor panel subassembly B arranged at a higher level is thus used for producing both the motor vehicles with "electric drive" and the motor vehicles with "hybrid drive". It is thus also the case for the motor vehicles with "hybrid drive" that a structural space with a large area is available underneath the floor panel subassembly B for the purposes of accommodating at least one battery 60 of board-like form.

This gives rise to a group of motor vehicles of one vehicle type, wherein the group comprises motor vehicles with three different drive concepts, the three drive concepts comprise a combustion engine ("combustion drive") or an electric motor ("electric drive") or a combination of a combustion engine and an electric motor ("hybrid drive"), two different floor panel subassemblies B are provided, wherein a first floor panel subassembly B, in its installed position in the motor vehicle, is arranged higher than a second floor panel subassembly B, wherein the bodyshell structures of the motor vehicles with "electric drive" and of the motor vehicles with "hybrid drive" have the first floor panel subassembly B and the bodyshell structure of the motor vehicles with "combustion drive" have the second floor panel subassembly B and wherein the motor vehicles with "electric drive" and the motor vehicles with "hybrid drive" have at least one battery 62, 60 arranged over a large area under the floor panel subassembly B.

LIST OF REFERENCE DESIGNATIONS

AG Automatic transmission
B Floor panel subassembly
FR Direction of travel
G Luggage compartment floor subassembly
H Hip point
L Front longitudinal member
LA Attachment part
S Bulkhead
ST Bulkhead member
V Screw connection point
V1 . . . V8 Line
VM Combustion engine
VO Front-end subassembly
12a Floor panel section
12b Floor panel section
14a Heel plate
14b Heel plate
16 Seat well
17 Front transverse member, rear axle
18a Front luggage compartment floor
18b Front luggage compartment floor
20a Rear luggage compartment floor
20b Rear luggage compartment floor
22 Rear transverse member, rear axle
24 Rear-end terminating member 26 Depression
27 Bulged portion
28 Depression
29 Screw connection point
30 Central longitudinal member
31 Tunnel longitudinal reinforcement
32a Side longitudinal member (sill)
32b Side longitudinal member (sill)
33a Section
33b Section
34a Section
34b Section
36a Central tunnel
36b Central tunnel
37a Free space
37b Free space
38 Tunnel top panel
40a Front seat transverse member
40b Front seat transverse member
42a Rear seat transverse member
42b Rear seat transverse member
50 Fuel tank
52 Fuel tank
60 Battery
61 Bracket
62 Battery
63 Bracket
64 Bulged portion
65 Bulged portion
66 Bracket
68 Bracket
70a Front subframe
70b Front subframe
71a Bushing
71b Bushing
72 Front suspension strut receptacle
73 Cantilever
74 Line
75 Shear panel
79 Bearing
80 Front-end structure
82 Rear-end member structure
84 Rear-end longitudinal member
86 Rear suspension strut receptacle
87 Partition assembly
88 Support
90 Tunnel reinforcement
90a Member
91 Holder
92 Partition
94 Rear shelf
96 Aperture
152 Fuel tank
160 Battery

What is claimed is:

1. A group of motor vehicles of one vehicle type, comprising:
motor vehicles with three different drive concepts, wherein
the three drive concepts comprise a combustion engine ("combustion drive") or an electric motor ("electric drive") or a combination of a combustion engine and an electric motor ("hybrid drive"),
two different floor panel subassemblies and two different luggage compartment floor subassemblies are provided,
floor regions of bodyshell structures of the motor vehicles are formed, in a manner dependent on a respective drive concept, through a combination of one of the two floor panel subassemblies and one of the two luggage compartment floor subassemblies,
a region of side longitudinal members of the motor vehicles is configured for attachment of different batteries,
the region of the side longitudinal members of the motor vehicles has a pattern of holes with a multiplicity of screw connection points which is configured for screw connection of different batteries, and
the screw connection points for attachment of the different batteries are at least partially identical.

2. The group of motor vehicles according to claim 1, wherein
a first floor panel subassembly is, in its installed position in the motor vehicle, arranged higher than a second floor panel subassembly.

3. The group of motor vehicles according to claim 1, wherein
one of the two floor panel subassemblies is configured to accommodate one battery and/or different batteries.

4. The group of motor vehicles according to claim 1, wherein
a front region of a first luggage compartment floor subassembly is, in its installed position in the motor vehicle, arranged higher than a front region of a second luggage compartment floor subassembly.

5. The group of motor vehicles according to claim 1, wherein
one of the two luggage compartment floor subassemblies is configured to accommodate one electric motor and/or different electric motors.

6. The group of motor vehicles according to claim 1, wherein
one of the two luggage compartment floor subassemblies is configured to accommodate one muffler of an exhaust system and/or different mufflers of an exhaust system.

7. The group of motor vehicles according to claim 1, wherein
the floor regions of the bodyshell structures of the motor vehicles with combustion drive are formed by combination of the second floor panel subassembly with the second luggage compartment floor subassembly.

8. The group of motor vehicles according to claim 1, wherein
the floor regions of the bodyshell structures of the motor vehicles with electric drive are formed by combination of the first floor panel subassembly with the first luggage compartment floor subassembly.

9. The group of motor vehicles according to claim 1, wherein
the floor regions of the bodyshell structures of the motor vehicles with hybrid drive are formed by combination of the first floor panel subassembly with the second luggage compartment floor subassembly.

10. The group of motor vehicles according to claim 1, wherein
the bodyshell structure of the motor vehicles is configured, in a region underneath a bulkhead of the motor vehicles, for attachment of different batteries.

11. The group of motor vehicles according to claim 1, wherein the two floor panel subassemblies each have, at a front side, attachment regions that are configured for attachment to a uniform bulkhead.

12. The group of motor vehicles according to claim 1, wherein
the two floor panel subassemblies have different central tunnels that are configured for attachment of uniform central consoles.

13. The group of motor vehicles according to claim 1, wherein
two front-end subassemblies with front longitudinal members are provided,
in the case of a first front-end subassembly, front longitudinal members end in a region of a bulkhead without continuation in a member structure at an underside of the floor panel subassembly, and
in the case of a second front-end subassembly, front longitudinal members are adjoined by central longitudinal members which extend into a region underneath the floor panel subassembly.

14. The group of motor vehicles according to claim 13, wherein
the floor regions of the bodyshell structures of the motor vehicles with combustion drive are formed by combination of the second front-end subassembly with the second floor panel subassembly.

15. The group of motor vehicles according to claim 14, wherein
the floor regions of the bodyshell structures of the motor vehicles with electric drive or with hybrid drive are formed by combination of the first front-end subassembly with the first floor panel subassembly.

16. The group of motor vehicles according to claim 13, wherein
the floor regions of the bodyshell structures of the motor vehicles with electric drive or with hybrid drive are formed by combination of the first front-end subassembly with the first floor panel subassembly.

17. The group of motor vehicles according to claim 1, wherein
the screw connection points not required for the fastening of the batteries are utilized for attachment of shear panels.

18. The group of motor vehicles according to claim 1, wherein
the screw connection points not required for the fastening of the batteries are utilized for attachment of stiffening means.

19. A method for producing a group of motor vehicles of one vehicle type, wherein
the group comprises motor vehicles with three different drive concepts,
the three different drive concepts comprise a combustion engine ("combustion drive") or an electric motor ("electric drive") or a combination of a combustion engine and an electric motor ("hybrid drive"), and,
to form floor regions of bodyshell structures of the motor vehicles, two different floor panel subassemblies and two different luggage compartment floor subassemblies are provided which are configured such that respectively different floor regions for the motor vehicles with the three different drive concepts are assembled through respective combination of one of the two floor panel subassemblies with one of the two luggage compartment floor subassemblies, wherein:
a region of side longitudinal members of the motor vehicles is configured for attachment of different batteries,
the region of the side longitudinal members of the motor vehicles has a pattern of holes with a multiplicity of screw connection points which is configured for screw connection of different batteries, and
the screw connection points for attachment of the different batteries are at least partially identical.

20. The method of claim 19, wherein:
the screw connection points not required for the fastening of the batteries are utilized for attachment of shear panels.

* * * * *